US011214642B2

(12) United States Patent
Godman et al.

(10) Patent No.: US 11,214,642 B2
(45) Date of Patent: Jan. 4, 2022

(54) LIQUID CRYSTAL ELASTOMERS

(71) Applicant: Government of the United States as Represented by the Secretary of the Air Force, Wright-Patterson AFB, OH (US)

(72) Inventors: Nicholas P Godman, Kettering, OH (US); Timothy J White, Longmont, CO (US); Hilmar Koerner, Beavercreek, OH (US); Benjamin A Kowalski, Dayton, OH (US); Anesia D Auguste, Beavercreek, OH (US); Tyler C Guin, Aiken, SC (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/653,876

(22) Filed: Oct. 15, 2019

(65) Prior Publication Data

US 2020/0115483 A1     Apr. 16, 2020

Related U.S. Application Data

(60) Provisional application No. 62/745,832, filed on Oct. 15, 2018.

(51) Int. Cl.
*C08F 222/20* (2006.01)
*C08J 5/12* (2006.01)
*C09D 135/02* (2006.01)

(52) U.S. Cl.
CPC ............. *C08F 222/20* (2013.01); *C08J 5/121* (2013.01); *C09D 135/02* (2013.01);
(Continued)

(58) Field of Classification Search
CPC .... C08F 222/20; C09D 135/02; C08J 15/121; C08J 2335/02; C09K 19/3809;
(Continued)

(56) References Cited

U.S. PATENT DOCUMENTS 8,785,589 B1   7/2014   Tan et al.
9,085,661 B1   7/2015   Tan et al.
(Continued)

OTHER PUBLICATIONS

T. H. Ware et al., "Voxelated Liquid Crystal Elastomers." Science, vol. 347 (2015) 982-984.
(Continued)

*Primary Examiner* — Ruiyun Zhang
(74) *Attorney, Agent, or Firm* — AFMCLO/JAZ; Chastity D. S. Whitaker

(57) ABSTRACT

Shape-programmable liquid crystal elastomers. The shape-programmable liquid crystal elastomers being synthesized by filling an alignment cell with liquid crystal monomers. The liquid crystal monomers align to a surface of the alignment cell and then are polymerized with a dithiol chain transfer agent. The alignment cell is configured to impose a director orientation on a portion of the shape-programmable liquid crystal elastomer. For some embodiments, liquid crystal elastomer laminates are prepared by arranging a plurality of liquid crystal elastomers such that a director orientation of each liquid crystal elastomer of the plurality is in registered alignment with an adjacent liquid crystal elastomer of the plurality. The arrangement is secured and the plurality of liquid crystal elastomers cured.

17 Claims, 38 Drawing Sheets
(24 of 38 Drawing Sheet(s) Filed in Color)

(52) U.S. Cl.
CPC ...... *C08F 2800/20* (2013.01); *C08F 2810/20* (2013.01); *C08J 2335/02* (2013.01)

(58) Field of Classification Search
CPC ........ C09K 19/3804; C09K 2019/0425; G02F 1/13378; G02F 1/133784; G02F 1/133788; G02F 2001/13415
USPC ................ 428/1.2, 1.26; 430/20; 252/299.01
See application file for complete search history.

(56) References Cited

U.S. PATENT DOCUMENTS

| | | | |
|---|---|---|---|
| 9,475,912 | B1 | 10/2016 | White et al. |
| 9,644,071 | B1 | 5/2017 | Tan et al. |
| 9,834,644 | B1 | 12/2017 | Tan et al. |
| 9,896,545 | B2 | 2/2018 | Tan et al. |
| 9,902,906 | B2 | 2/2018 | White et al. |
| 10,301,430 | B2 | 5/2019 | Tan et al. |
| 2016/0312120 | A1 | 10/2016 | White et al. |
| 2016/0313607 | A1 | 10/2016 | White et al. |
| 2017/0233529 | A1 | 8/2017 | Tan et al. |
| 2018/0022872 | A1 | 1/2018 | Tan et al. |
| 2018/0208847 | A1 | 7/2018 | White et al. |
| 2019/0300792 | A1 | 10/2019 | Guin et al. |

OTHER PUBLICATIONS

T. H. Ware et al., "Programmable Liquid Crystal Elastomers Prepared by Thiol-Ene Photopolymerization." ACS Macro Lett., vol. 4 (2015) 942-946.

N. B. Cramer et al., "Kinetics of thiol-ene and thiol-acrylate photopolymerizations with real-time fourier transform infrared." J. Polym. Sci., Part A: Polym. Chem., vol. 39 (2001) 3311-319.

J. Kupfer et al., "Nematic liquid single crystal elastomers." Makromol. Chem., Rapid Common., vol. 12 (1991) 717-726.

D. J. Broer et al., "In-situ photopolymerization of oriented liquid-crystalline acrylates, 5. Influence of the alkylene spacer on the properties of the mesogenic monomers and the formation and properties of oriented polymer networks." Makromol. Chem., vol. 192 (1991) 59-74.

N. P. Godman et al., "Synthesis of elastomeric liquid crystalline polymer networks via chain transfer," ACS Macro Lett., vol. 6 (2017) 1290-1296.

United States Patent and Trademark Office, Non-Final Office Action in U.S. Appl. No. 15/877,533, dated Nov. 20, 2019, 6 pages total.

N. Torras et al., "Liquid-crystalline elastomer micropillar array for haptic actuation," J. Mater. Chem. C, vol. 1 (2013) 5183-5190.

Y Yu et al., "Photomechanical effects of ferroelectric liquid-crystalline elastomers containing azobenzene chromophores," Angewandte Chemie, vol. 46 (2007) 881-883.

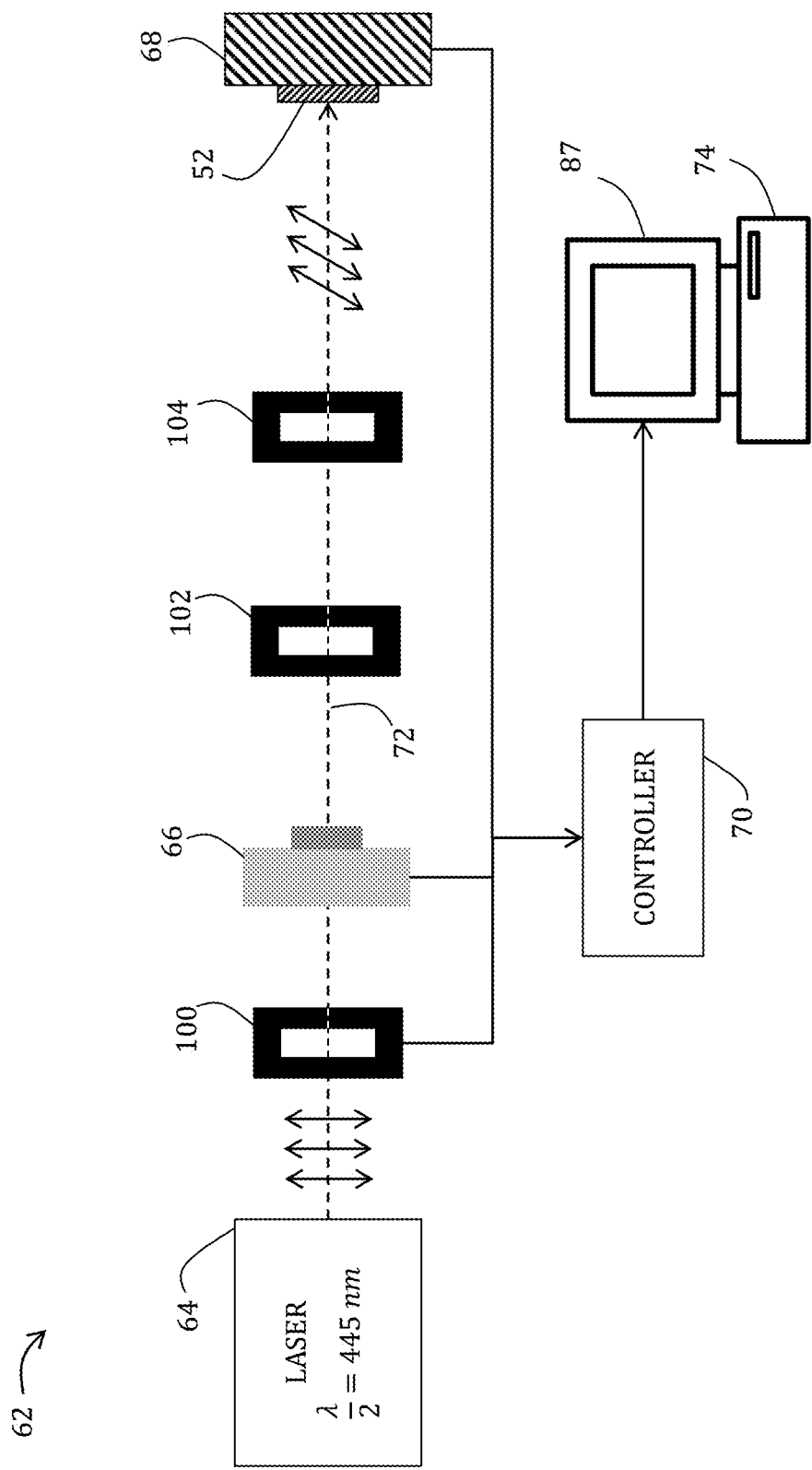

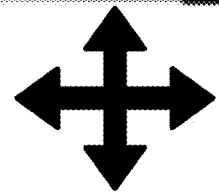
FIG. 19A
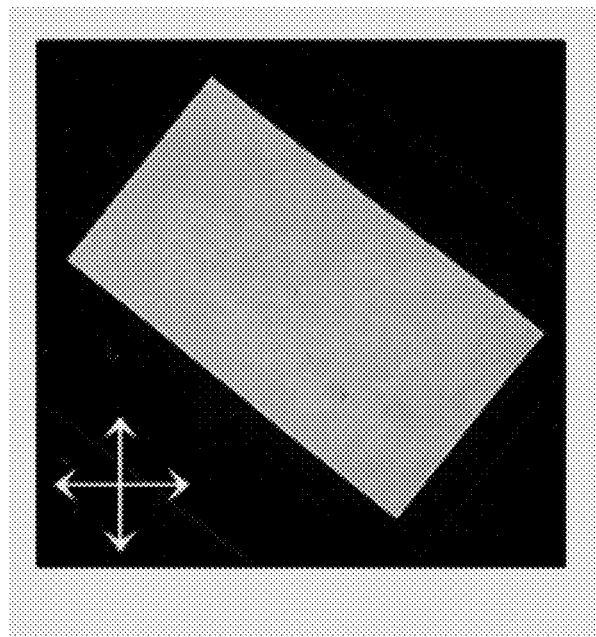
FIG. 19B

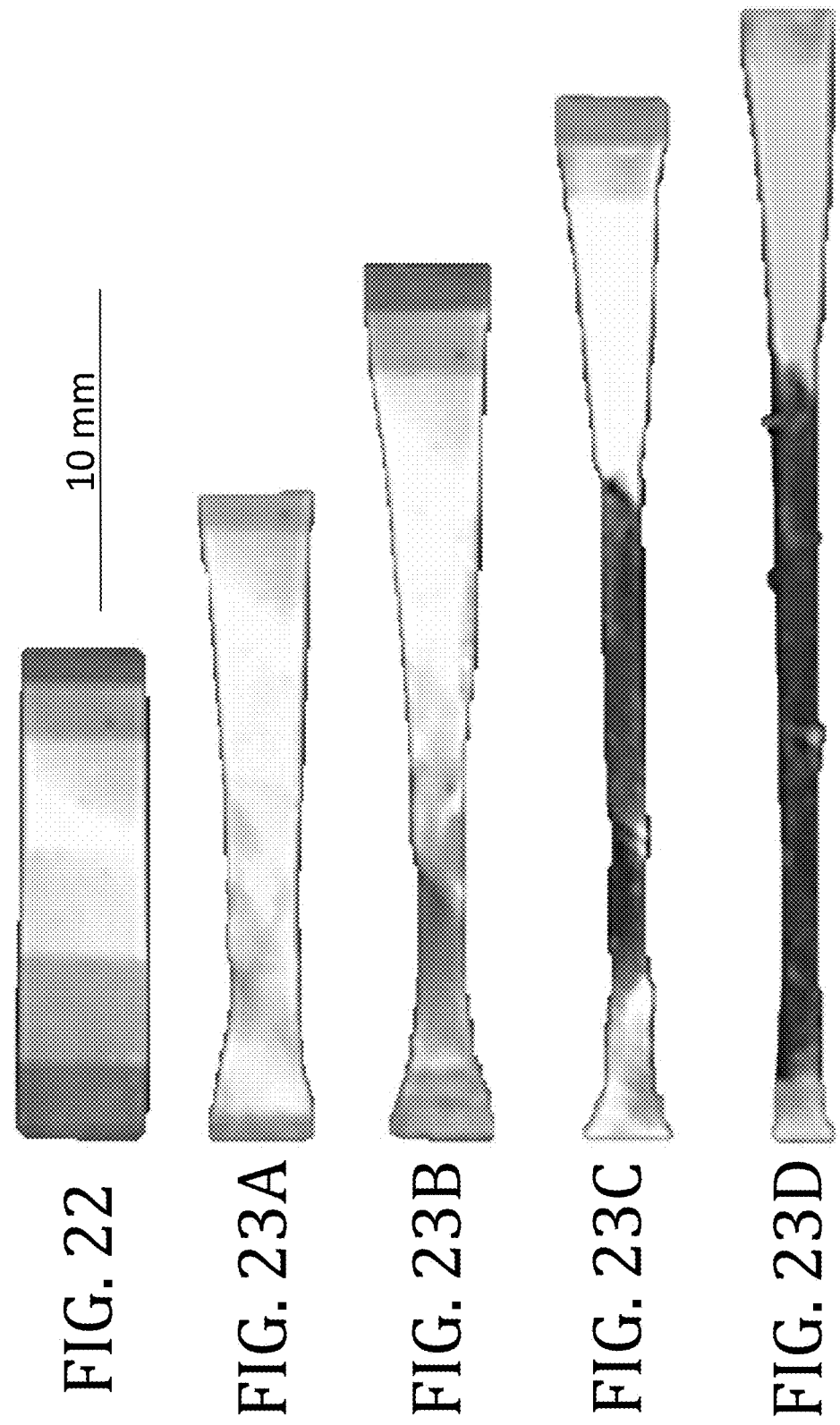

Cycle 1
180 °C
960 mg
150x film weight

Cycle 10
180 °C
960 mg
150x film weight

Cycle 10
35 °C

LIQUID CRYSTAL ELASTOMERS

Pursuant to 37 C.F.R. § 1.78(a)(4), this application claims the benefit of and priority to prior filed Provisional Application Ser. No. 62/745,832, filed Oct. 15, 2018, which is expressly incorporated herein by reference in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally to elastomers and, more particularly, to liquid crystal elastomers.

BACKGROUND OF THE INVENTION

Preprogramming complex mechanical responses into soft materials is a topic of considerable interest within the scientific community. Spatial organization of monomeric (oligomeric) precursors to form anisotropic polymeric materials have been discussed as potential paradigm shifts in stimuli-responsive drug delivery, sensing, and soft robotics. While many approaches have been explored in the literature, three key aspects are quintessential to the design and implementation of novel, multifunctional material platforms: (1) facile synthetic strategies, (2) processability, and (3) local regulation and control of the mechanical properties.

Liquid crystalline elastomers ("LCEs") have garnered significant attention in the past decade due to their nonlinear mechanical deformation and dramatic stimuli-induced deformation. The primary approach to prepare LCEs is via hydrosilylation of olefinic liquid crystalline monomers to produce polysiloxane elastomers. Polysiloxane elastomers are widely recognized for their high extensibilities and low moduli, largely attributable to Si—O—Si bond within the polymer backbone. However, alignment of polysiloxane LCEs has been limited to mechanical loading either during or after preparation to align the mesogens to the strain direction.

Liquid crystalline monomers ("LCMs") capable of free-radical photopolymerization (such as the commercially available diacrylates illustrated in FIG. 1) have been investigated for more than 30 years due to their straightforward fabrication and compelling optical, thermal, and mechanical properties. Prior examination of these materials have primarily focused on homopolymerization of difunctional LCMs to produce glassy liquid crystalline polymer networks (LCNs). Glassy LCNs retain the optical properties of the LCM in robust films enabling end use as light control films in displays. LCMs are readily amenable to surface alignment techniques including photoalignment. Numerous papers have reported on the stimuli-response of these materials and the ability to induce shape transformation within LCN.

The thermomechanical properties of LCNs may be influenced by copolymerizing difunctional LCMs with monofunctional LCMs to reduce the molecular weight between cross-links. LCE-like materials have been prepared and characterized, exhibiting upward of 20% to 30% strain and semisoft elasticity. However, this approach inherently dilutes the main-chain character of the LCN/LCE and known to limit the optimum association of orientation and elasticity or actuation. The preparation of main-chain type LCEs by oligomerizing LCMs via an aza-Michael addition reaction was been previously described, such as in U.S. Application No. 62/150,778; Ser. Nos. 15/135,087; 15/135,108; and 15/877,533 the disclosures being incorporated herein by reference, each in their entirety. While this approach is amenable to spatially patterned surface-derived alignment and has enabled initial studies of the directed self-assembly of LCEs, the method is slow (more than 24 hrs per sample) and is limited in the range of accessible cross-link densities.

In some implementations, shape reconfigurability will be an important aspect of robotic control. Stimuli-responsive shape change of monolithic elements is exhibited by a range of material platforms, including shape memory alloys ("SMAs"). SMAs achieve large force output but limited deformation, and are found in end use applications in medicine, automobiles, and aerospace. Recent explorations focus on soft materials in which the mechanical response may be localized and potentially programmed, at the expense of output force. Natural musculo-skeletal systems employ anisotropy to optimize function as well as grade the interfacial interaction of stiff and soft elements.

Robust and high-throughput patterning LCEs has been enabled by exploiting directed self-assembly (both spatial and hierarchical) onto a patterned template surface. The molecular orientation governs the anisotropy of macroscopic mechanical response, and monolithic elements composed of these materials may be permanently "programmed" to exhibit reversible, stimuli-responsive shape transformations. A wide range of shapes may be realized such as origami folds, arrays of cones, or arbitrary curvatures such as paraboloids. Notably, these materials are continuous in composition and absent of multi-material interfaces. Mechanical responses in these materials may be triggered by exposure to heat, light, electrical fields.

The tremendous shape transformation of LCEs may create useful work. LCEs with uniform orientation (via mechanical stretching) exert muscle-like contractile force generating strains of up to 400%. A number of recent reports detail a comparatively distinctive approach to generating force. LCE sheets with spatially patterned orientation may act as out-of-plane lifters, using shape change to generate considerable work over a large stroke, with a work capacity of as much as 2.6 J/kg (from a soft material of 50 μm thickness). The extraordinary work capacity of these materials is attributable to the fundamentals of the shape transformation. The spatial variation in the director profile dictates that the material must emanate into a third dimension, via stretch. It is predicted in $_{21}$ that force outputs should correlate to increasing the film thickness. However, the achievable thickness of LCEs prepared by surface anchoring is limited. For cell thicknesses exceeding roughly 50 μm, the patterned alignment surface may no longer effectively prescribe alignment through the entire cell, due to finite anchoring energies of surface interactions.

As such, there remains a need for improved materials, methods of synthesis, and greater adaptability for resulting LCE shapes and surfaces and for LCEs that are arbitrarily thick so as to maintain complex director orientations.

SUMMARY OF THE INVENTION

The present invention overcomes the foregoing problems and other shortcomings, drawbacks, and challenges of previous LCEs and associated methods of synthesis. While the invention will be described in connection with certain embodiments, it will be understood that the invention is not limited to these embodiments. To the contrary, this invention includes all alternatives, modifications, and equivalents as may be included within the spirit and scope of the present invention.

According to embodiments of the present invention, shape-programmable liquid crystal elastomers are synthesized by filling an alignment cell with liquid crystal monomers. The liquid crystal monomers align to a surface of the alignment cell and then are polymerized with a dithiol chain transfer agent. The alignment cell is configured to impose a director orientation on a portion of the shape-programmable liquid crystal elastomer.

Other embodiments of the present invention are directed to liquid crystal elastomer laminates prepared by arranging a plurality of liquid crystal elastomers such that a director orientation of each liquid crystal elastomer of the plurality is in registered alignment with an adjacent liquid crystal elastomer of the plurality. The arrangement is secured and the plurality of liquid crystal elastomers cured.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 4 and 4A are alternative, schematic views of exemplary systems for conducting a portion of the method of FIG. 2.

FIGS. 19A and 19B demonstrate the birefringence associated with LCE films prepared in accordance with embodiments of the present invention.

FIG. 22 is a birefringence image of a film prepared in accordance with embodiments of the present invention and having the surface alignment of FIG. 21.

FIGS. 23A-23D illustrate an influence of surface alignment voxels on deformation of the film of FIG. 22.

Figure 1:
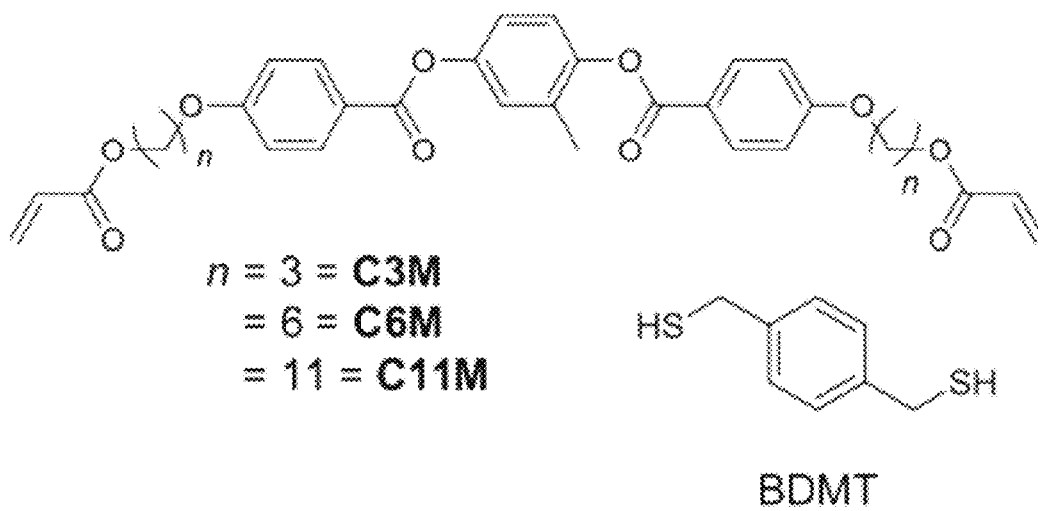
FIG. 1 is a schematic illustration of the chemical structure of conventional acrylates according to the prior art.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Some embodiments of the present invention relate to N. P. GODMAN et al., "Synthesis of elastomeric liquid crystalline polymer networks via chain transfer," ACS Macro Lett., Vol. 6 (2017) 1290-1295; the corresponding Supplemental Information, available at http://pubs.acs.org/ T. GUIN et al., "Layered liquid crystal elastomer actuators," Nat. Comm., Vol. 9 (2018) 2531; the corresponding Supplemental Materials, available at https://www.nature.com/articles/s41467-018-04911-4 and https://static-content.springer.com/esm/art%3A10.1038%2Fs41467-018-04911-4/MediaObjects/41467_2018_4911_MOESM1_ESM.pdf, and the supplemental movie provided at https://static-content.springer.com/esm/art%3A10.1038%2Fs41467-018-04911-4/MediaObjects/41467_2018_4911_MOESM4_ESM.avi. The contents of these disclosures are incorporated herein by reference, each in its entirety.

Referring now to the figures, methods of preparing and using facile materials chemistry platforms conducive to the surface-alignment of liquid crystals are shown and described. The sensitivity of the materials chemistry to surface-alignment is combined with photoalignment of volumetric elements (also known as "voxels") having discrete directors (or domains of similar directors) of aligned liquid crystal elastomer ("LCE") or liquid crystal network ("LCN"). Enabled by the large strain inherent to LCEs, the sensitivity of the material chemistry to surface-alignment, and the optical patterning methods, programmable shape change, and actuation in a monolithic element derived from a variety of complex director profiles may be achieved.

As used herein, "elastomer" refers to a polymer having viscoelasticity—that is, being both viscous and elastic. These materials generally have a glass transition temperature less than about 30° C. (or in some embodiments, less than 20° C.), low Young's modulus, and a high failure strain, compared to other polymer materials.

As used herein, "liquid crystal" or "LC" refers to a state of matter having properties consistent with those of conventional liquids and those of conventional crystals.

As used herein, "mesogen" is a part of a molecule or compound of a liquid crystal that is responsible for the liquid and crystal properties.

As used herein, "macromers" are polymerizable molecules formed from a chain-extension reaction of monomer precursors.

As used herein, "director" refers to an average molecular orientation of the mesogens comprising the liquid crystal.

As used herein, "voxel" refers to a discrete, three-dimensional area within a liquid crystal elastomer having a director.

As used herein, "domain" refers to a plurality of voxels having similar directors.

As used herein, "acrylates" are salts, esters, and conjugate bases of acrylic acid and its derivatives.

As used herein, "methacrylates" are salts, esters, and conjugate bases of methacrylic acid ("MAA"), $CH_3CH_2CCOOH$, and its derivatives.

As used herein, "thiols" are organosulfur compounds: HSRSH, wherein R may include alkyl chains, such as ethyl, propyl, or butyl groups.

As used herein, "vinyls" are ethenyl functional groups: $—C_2H_3$

As used herein, "epoxides" are cyclic ethers having a three-atom ring: $R^1R^2COCR^3R^4$.

As used herein, "amines" are compounds and functional groups comprising a basic nitrogen atom, e.g., having a lone pair of electrons: $RNH_2$, wherein R may be an alkyl chain, for example, an n-butyl group.

As used herein, "diacrylates" are molecules having two acrylate groups.

As used herein, "nematic" refers to a liquid crystal in which the mesogens are oriented in parallel, but not in well-defined planes.

As used herein, a "smectic" refers to a liquid crystal having mesogens oriented in parallel and arranged in well-defined planes.

As used herein, a "chiral phase" refers to a nematic liquid crystal possessing a chiral center between well-defined planes.

As used herein, "defect" refers to a topological pattern of order within a liquid crystal elastomer. Defects may be characterized by strength and charge.

As used herein, "glass transition temperature" or "$T_g$" refers the temperature at which glass transition occurs. "Glass transition," as it is used herein, is a reversible transition of a material from a "glassy" state to an elastomeric state.

As used herein, "carbon nanotubes" or "CNT" refers to tubular-shaped molecular structures comprising carbon rings having a diameter on the order of nanometers and lengths ranging from the order of nanometers to millimeters.

Figure 2:
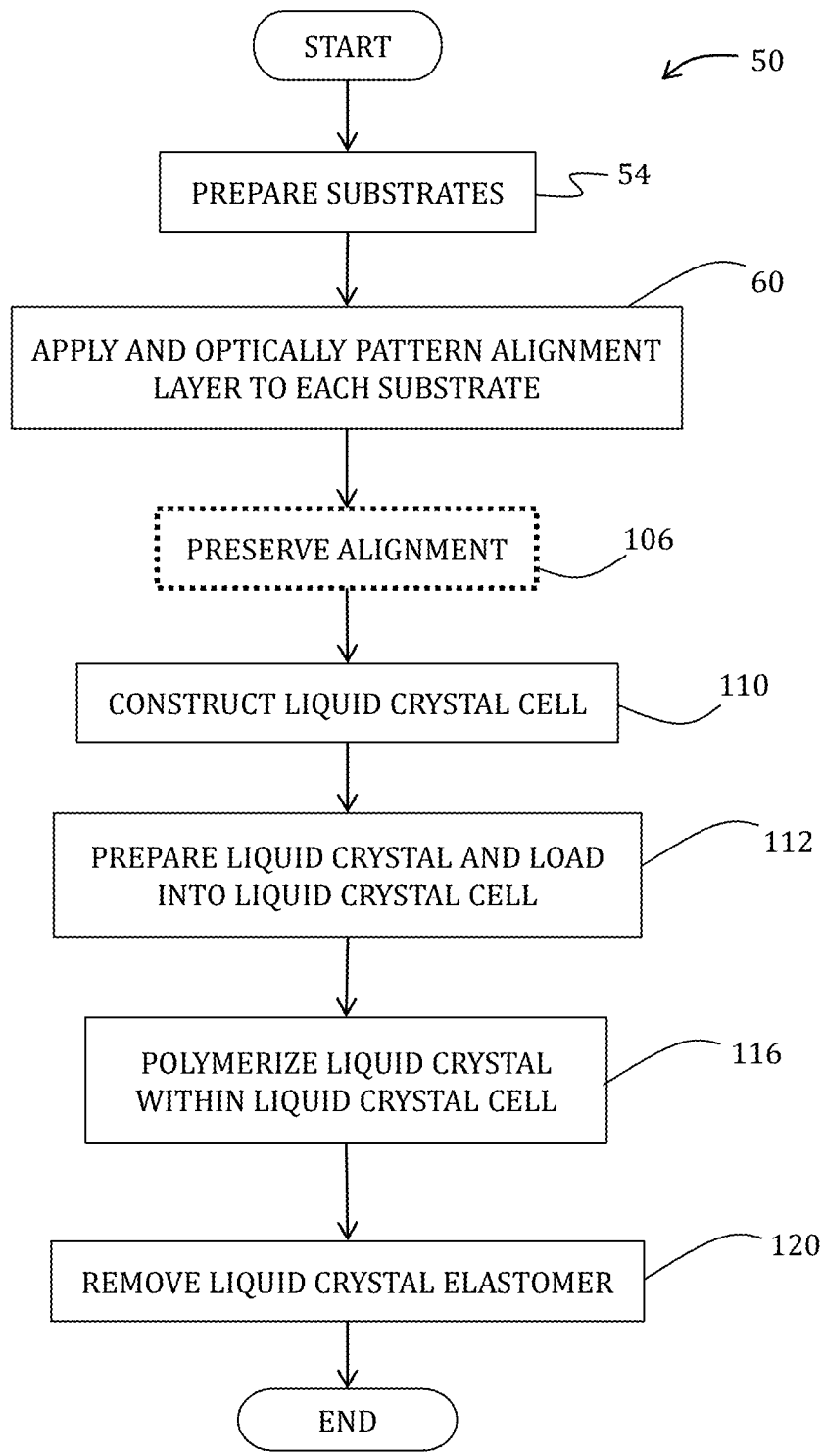
FIG. 2 is a flow chart illustrating a method of preparing elastomers according to embodiments of the present invention.
Figure 3:
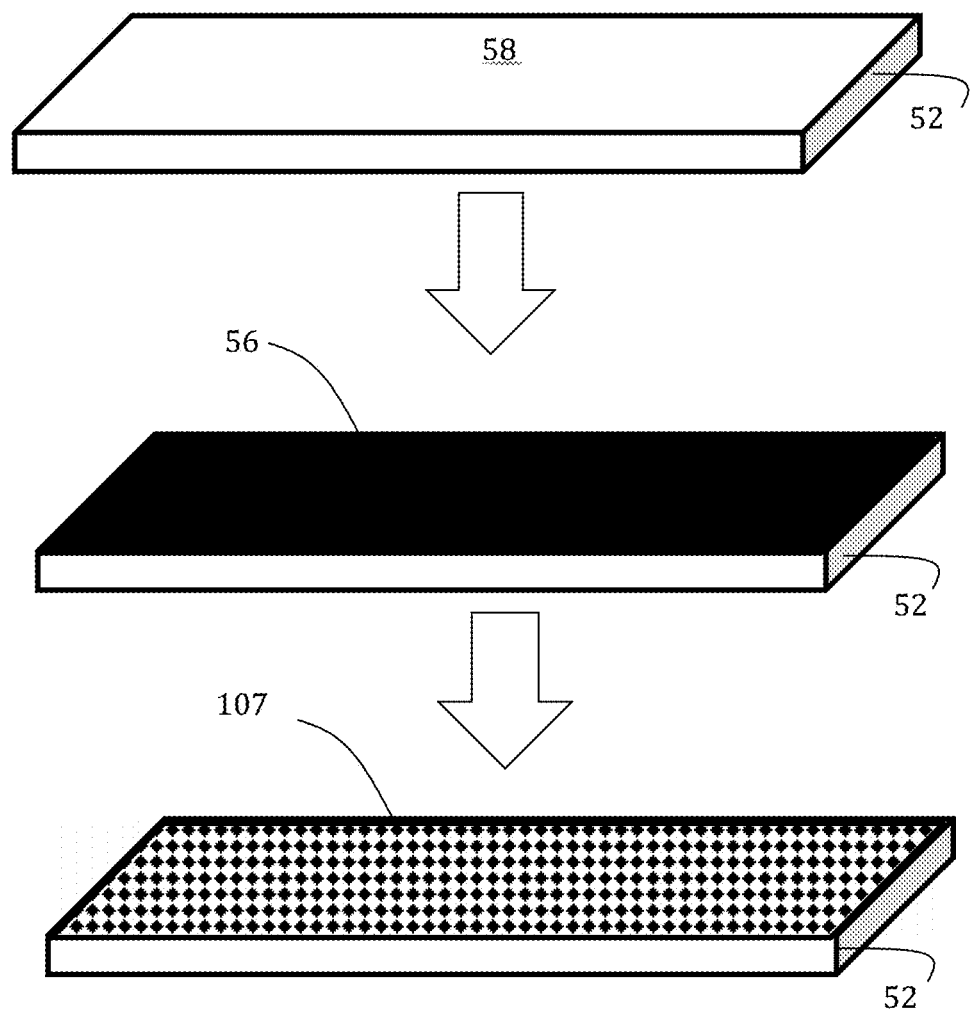
FIG. 3 is perspective view of substrate preparation for use in the method of FIG. 2.

In that regard and with reference now to a method 50 according to an embodiment of the present invention illustrated in FIGS. 2 and 3, a substrate 52 is prepared (Block 54). Preparation of the substrate 52 may include various combinations of cleaning, baking, washing, drying, and so forth, and as would be known by those of ordinary skill in the art. The substrate 52, itself, may comprise glass, poly (ethylene terephthalate), or other inert materials.

An alignment layer 56 may then be applied to a cleaned surface 58 of the substrate 52 (Block 60). The alignment layer 56 generally comprising a chromophore that, when illuminated, behaves as a molecular oscillator until the absorption cross section is minimized with the final orientation being 90° to the electric field vector of the incident light. Said another way, the chromophores of the alignment layer, when exposed to light (such as light emitted from a laser), having particular polarization, amplitude, and phase, may so orient themselves with respect to the surface 58 so as to be orthogonal to the electric field vector of that light. Suitable alignment layer materials may comprise, for example, an azobenzene polymer, a stilbene polymer, a linearly polymerizable polymer, or other suitable photosensitive material know to those of ordinary skill in the art of liquid crystal alignment. Application of the alignment layer 56 may include dispersion (such as from a pipette or other like device) or printing, spinning to ensure uniformity, baking to set the alignment layer 56 and remove residual solvent, and so forth.

With the alignment layer 56 applied, the alignment layer 56 may then be optically patterned (continuation of Block 60). An exemplary system 62 for optically patterning the alignment layer 56 according to one exemplary method of the present invention is shown in FIG. 4. Generally, the system 62 includes a laser 64 (for example, a 445 nm laser), a moveable waveplate 66, and a moveable substrate support 68. The moveable waveplate 66 is operably coupled to a controller 70, which is configured to move the waveplate 66 with respect to a directionality of the beam 72, which controls a polarization of the light to be used for patterning the alignment layer 56 (FIG. 3). Although not specifically shown, movement of the waveplate 66 may include one or more motors (such as a rotary motor), which may work in concert with movement of the substrate support 68 to dynamically control irradiation over an area as small as 100 µm². The system 62 is configured to manipulate the local surface-alignment of liquid crystalline cells prepared with the alignment layer 56 (FIG. 3).

Figure 5:
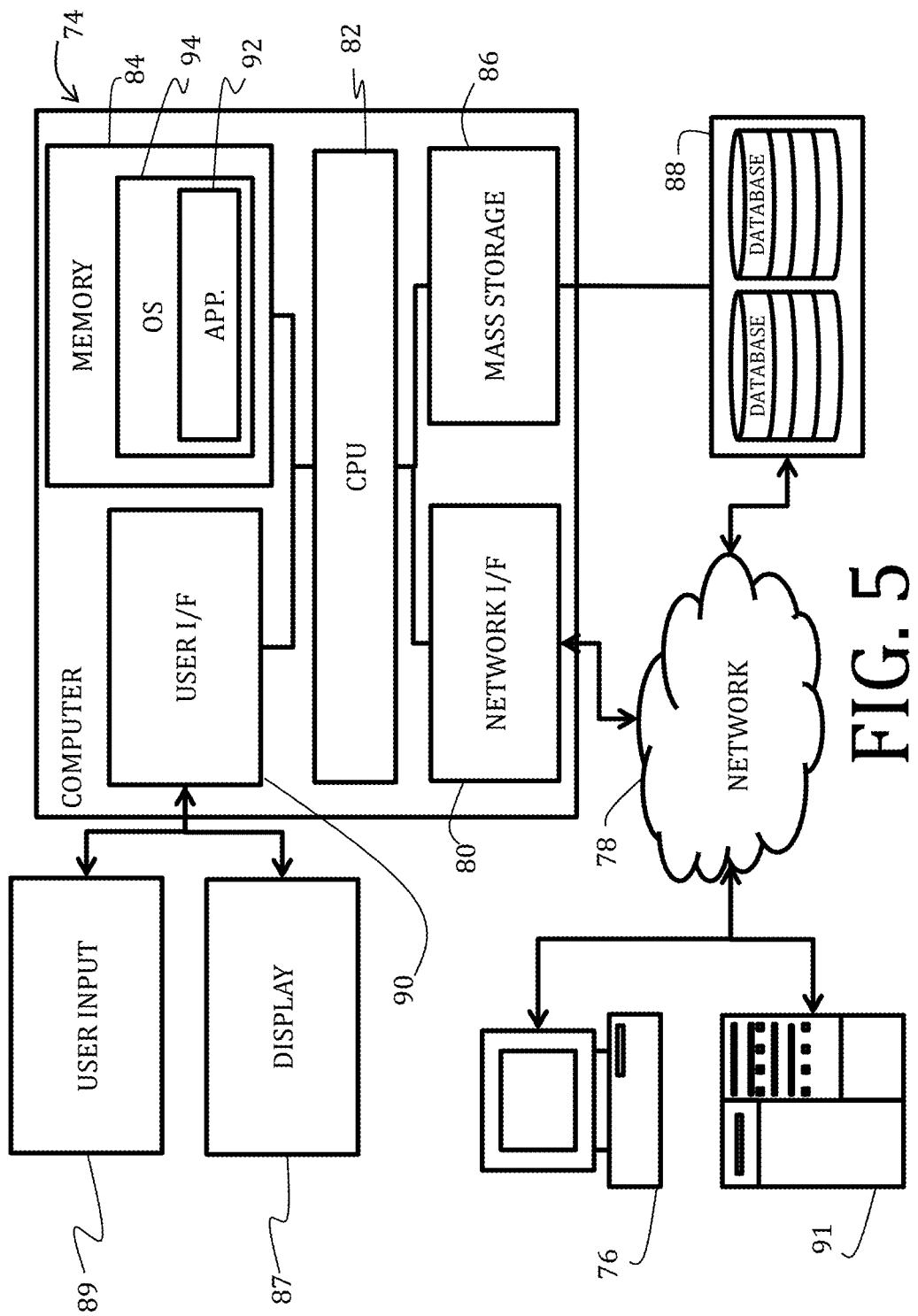
FIG. 5 is a schematic representation of an exemplary computer suitable for conducting a portion of the method of FIG. 2.

The controller 70 is operably coupled to a computer 74, which is described in greater detail with respect to FIG. 5, and which may be considered to represent any type of computer, computer system, computing system, server, disk array, or programmable device such as multi-user computers, single-user computers, handheld devices, networked devices, or embedded devices, etc. The computer 74 may be implemented with one or more networked computers 76 using one or more networks 78, e.g., in a cluster or other distributed computing system through a network interface 80 (illustrated as "NETWORK I/F"). The computer 74 will be referred to as "computer" for brevity's sake, although it should be appreciated that the term "computing system" may also include other suitable programmable electronic devices consistent with embodiments of the invention.

The computer 74 typically includes at least one central processing unit 82 (illustrated as "CPU") coupled to a memory 84 along with several different types of peripheral devices, e.g., a mass storage device 86 with one or more databases 88, an input/output interface 90 (illustrated as "I/O I/F" with associated display 87 and user input device 89), and the Network I/F 80. The memory 84 may include dynamic random access memory ("DRAM"), static random access memory ("SRAM"), non-volatile random access memory ("NVRAM"), persistent memory, flash memory, at least one hard disk drive, and/or another digital storage medium. The mass storage device 86 is typically at least one hard disk drive and may be located externally to the computer 74, such as in a separate enclosure or in one or more networked computers 76, one or more networked storage devices (including, for example, a tape or optical drive), and/or one or more other networked devices 91 (including, for example, a server).

The CPU 82 may be, in various embodiments, a single-thread, multi-threaded, multi-core, and/or multi-element processing unit (not shown) as is well known in the art. In alternative embodiments, the computer 74 may include a plurality of processing units that may include single-thread processing units, multi-threaded processing units, multi-core processing units, multi-element processing units, and/or combinations thereof as is well known in the art. Similarly, the memory 84 may include one or more levels of data, instruction, and/or combination caches, with caches serving the individual processing unit or multiple processing units (not shown) as is well known in the art.

The memory 84 of the computer 74 may include one or more applications 92 (illustrated as "APP."), or other software program, which are configured to execute in combination with the Operating System 94 (illustrated as "OS") and automatically perform tasks necessary for operating the transducers and/or reconstructing the images with or without accessing further information or data from the database(s) 88 of the mass storage device 86.

Those skilled in the art will recognize that the environment illustrated in FIG. 5 is not intended to limit the present invention. Indeed, those skilled in the art will recognize that other alternative hardware and/or software environments may be used without departing from the scope of the invention.

Referring again to FIG. 4, the system 62 may further comprise a shutter 100, a collimator 102, and a lens 104. Altogether, the system 62 operates to focus the laser beam 72 onto each point on the alignment layer 56 (FIG. 3) of the substrate 52 having a desired polarization. Linear polarization angles from about 0° to about 180° with respect to the beam propagation direction may be achieved. Exposure dosage is controlled through the shutter and power of the laser. Dose is dependent on the alignment layer, for example, for azobenzene dyes the exposure energy may be 0.1 J/cm$^2$ and higher.

As shown, the system 62 may be configured to provide a focal spot having a maximum dimensions ranging from nanometer scales to meter scales. More particularly, a maximum dimension of about 100 μm may be easily achieved. As such, a 200×200 pixelated square area (comprising 40,000 pixels, 4 cm$^2$), each pixel being 100 μm, and presuming a 10 msec exposure time per pixel, may take approximately 80 min to pattern.

Figure 4A:
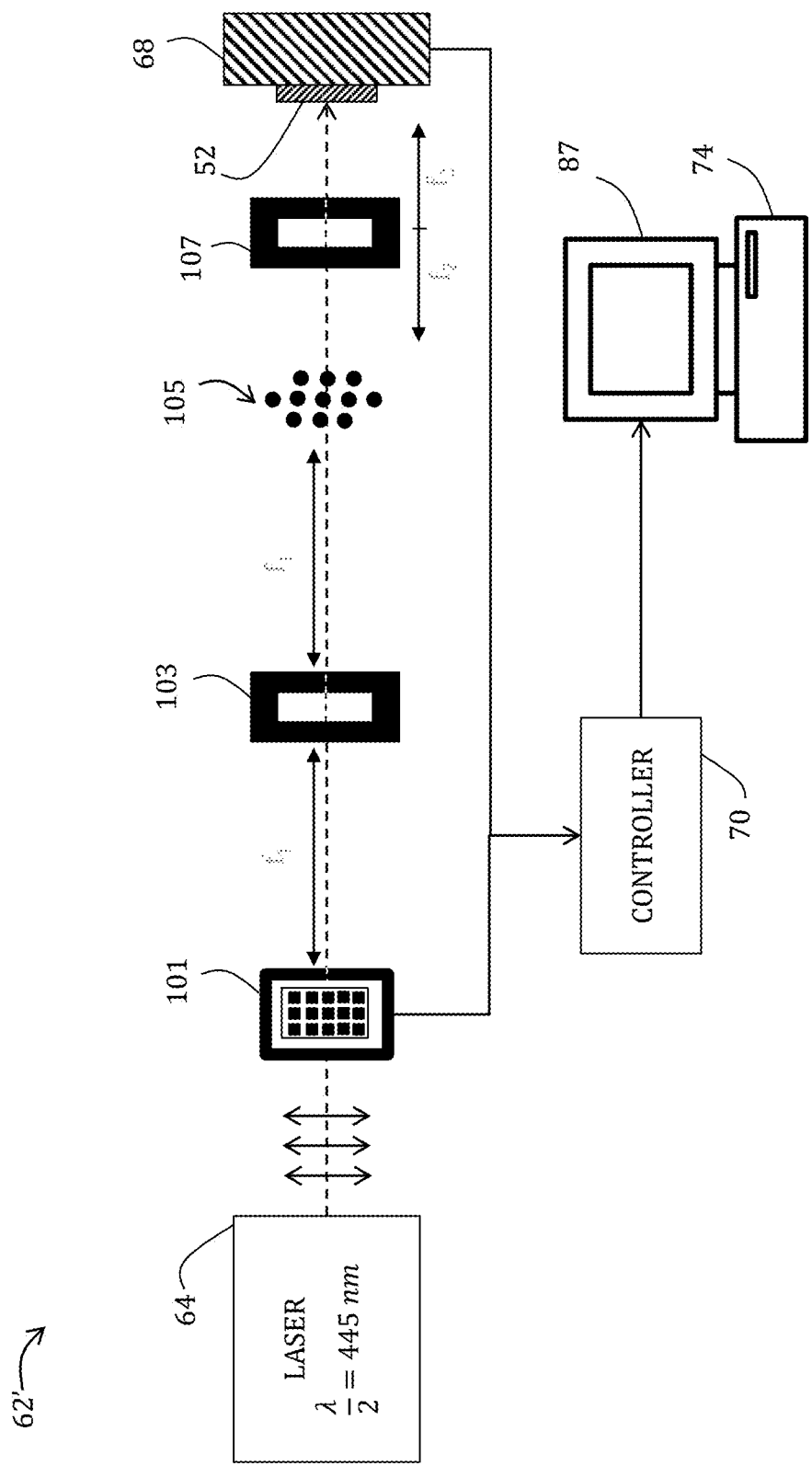

Alternatively, and as is shown in FIG. 4A, a system 62' is shown and is similar to the system 62 of FIG. 4. In the illustrated system 62', a spatial light modulator 101 replaces the waveplate 66 (FIG. 4). The spatial light modulator 101 imposes a spatial modulation pattern onto light from the laser 64 by altering at least one of amplitude, phase, or polarization of the light. The modulated light may be focused by a first lens 103 to form a Fourier transform at a plane 105. A second lens 107 focuses the Fourier transform at the plane 105 to the image to be patterned. According to an exemplary embodiment, using the spatial light modulation system 62' enables simultaneous writing of 800×600 independent polarizations.

Using the spatial light modulation system 62' of FIG. 4A, it is possible to pattern 10$^6$ pixels, for example, with 15 μm resolution in about 1 second per square centimeter. As such, the spatial light modulation system 62' of FIG. 4A, as compared to the pixel-by-pixel system 62 of FIG. 4, is capable of patterning substrates at a much higher rate.

Referring now again to FIG. 2, if necessary or otherwise desired, alignment of the optically patterned alignment layer 107 (FIG. 3) may optionally be preserved (Block 106). For instance, polymerizing a thin layer of liquid crystal monomer (generally, several hundred nanometers thick, such as ranging from 300 nm to 500 nm) atop the patterned alignment layer 107 (FIG. 3) may be used.

Figure 6:
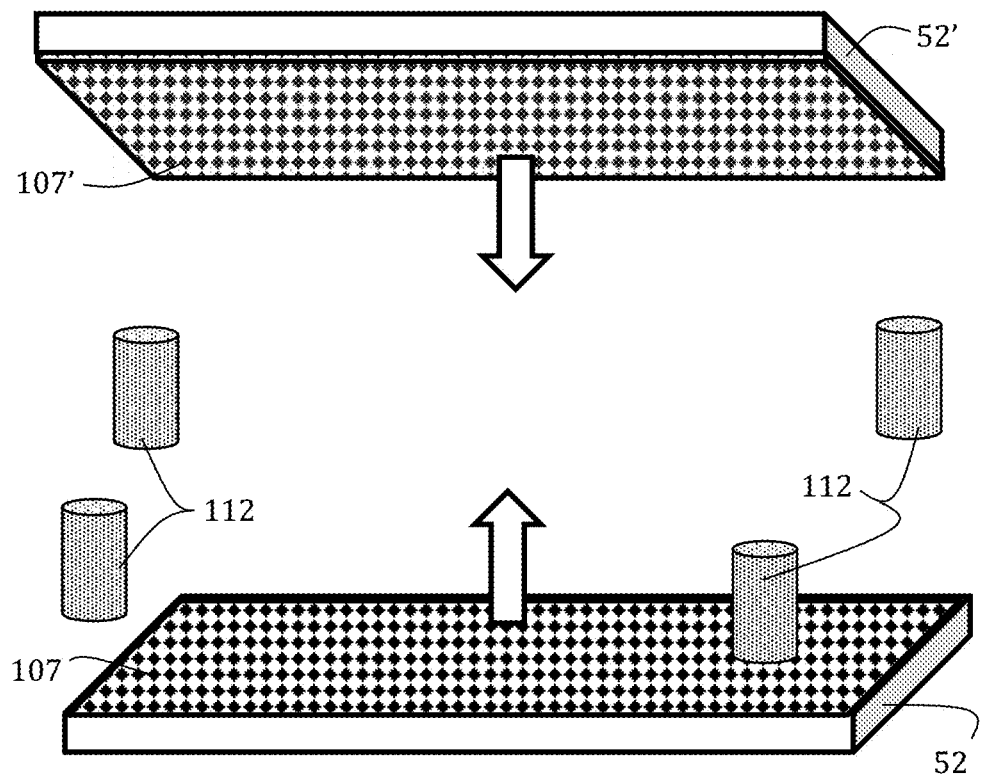
FIGS. 6 and 7 are perspective and side elevational views (in cross-section), respectively, of forming and filling a cell according to the method of FIG. 2.
Figure 7:
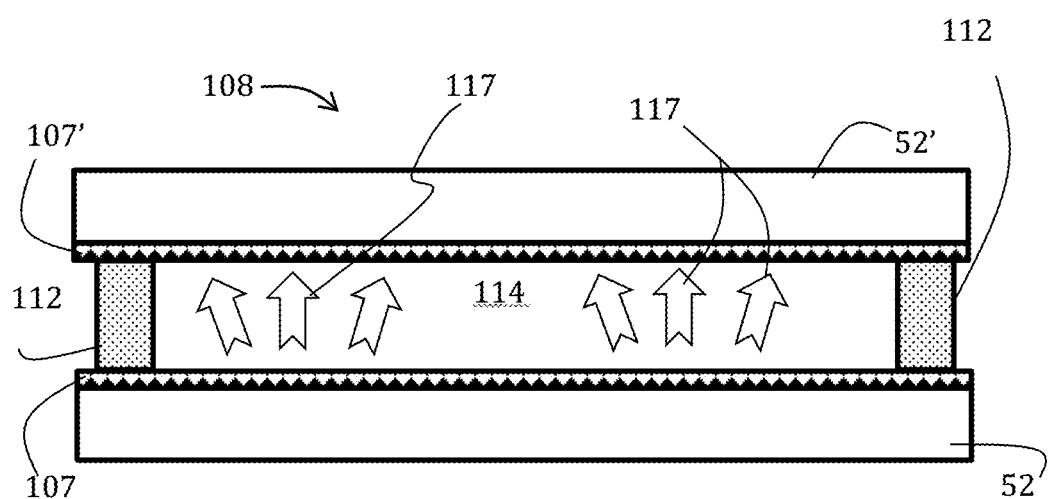

Turning now to FIGS. 6 and 7, with continued reference to FIG. 2, a liquid crystal cell 108 may then be constructed (Block 110). In that regard, prepared substrates 52, 52' may be arranged such that the patterned alignment layers 107, 107' of each are facing inwardly, separated with spacers 112, and at least partially secured and/or sealed so as to form a cavity 114 there between. Additionally, or alternatively, spacers (not shown), such as micro-sized glass spheres, may be mixed into an adhesive (for example, an epoxy) such that the layers 107, 107' may be simultaneously spaced and secured and/or sealed. Size of the spacers 112 or micro-sized glass spheres may determine the final thickness of a resultant LC film and may range generally from tens of microns to hundreds of microns, or more particularly, for example, spacers 112 having a maximum dimension of 50 μm may be used.

The cavity 114 may then be filled with a nematic mixture of liquid crystal monomers with CNTs configured to crosslink and to reversibly shape change according to a complex programming using surface alignment in accordance with an embodiment of the present invention (Block 112).

Figure 8:
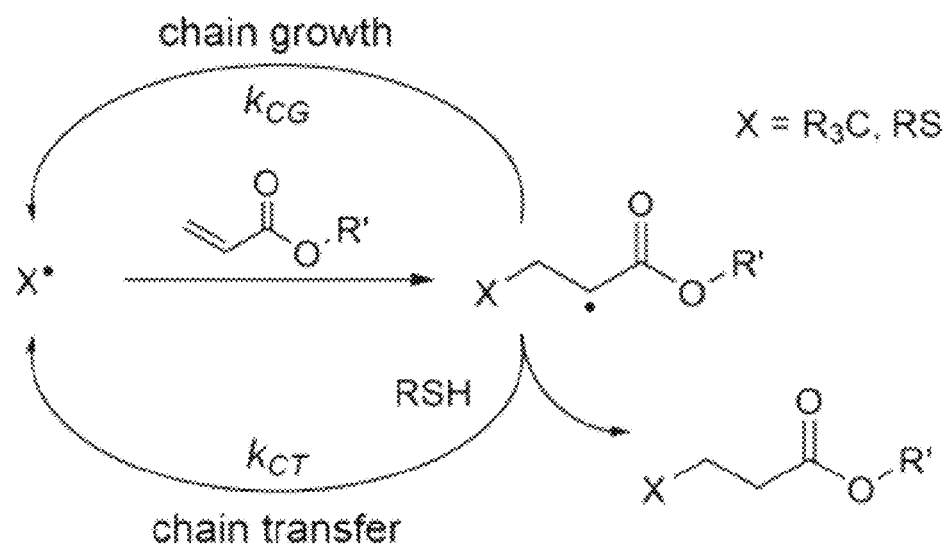
FIG. 8 diagrammatically illustrates a method of synthesizing LCEs according to an embodiment of the present invention.

A method for preparing the nematic mixture according to an embodiment of the present invention is illustrated in FIG. 8. The illustrative chemical mechanism provides a synthetic strategy to quickly and efficiently prepare LCEs through the usage of chain transfer agents ("CTA"). Thiol-acrylate reactions may proceed either through acrylate chain growth or thiol chain transfer (chain termination). Herein, conventional LCMs (for example, C3M, C6M, and C11M) are reacted with dithiol monomers to maximize a number of reaction sites for the non-liquid crystalline additive at low concentration.

Polymerization according to embodiments of the present invention is primarily associated with acrylate homopolymerization of diacrylates. The homopolymerization, if left alone, would form glassy, densely cross-linked polymer networks. Introducing CTAs alters the homopolymerization to a "chain extender" (similar to the role of the amine in the aza-Michael addition reaction in prior patent application) or a chain terminating site. Kinetic study of the reaction shows that a rate of chain transfer exceeds propagation through extension, suggesting the chain terminating site reaction is primary. Further, only 30% to 50% of thiol is incorporated into the network, which may confirm that this monomer is primarily terminating propagating polymer chains. Suitable CTAs may include C2-C6 alkyl-dithiols or, more specific examples may include ethane dithiol, propane dithiol, hexane dithiol, and 1,4-benezenedimethanethiol.

Conventional methods for LCE formation operated by increasing the molecular weight between crosslinks in the polymer networks, which increases the molecular weight (e.g., the number of monomer units) and suppresses the glass transition temperature and enhances viscoelastic nature in the material. For the embodiments of the present invention, while not wishing to be bound by theory, LCE reactions here create a "hyperbranched" polymer network via the competing chain extension and chain terminating reactions. Glass transition is suppressed, similar to conventional methods; however, suppression occurs via chain transfer reactions. The amount of thiol incorporated into the LCE due to the use of the CTA ranges from about 30% to about 50%.

The polyacrylate materials according to embodiments of the present invention exhibit large, reversible shape changes with strains greater 475%, rivalling properties observed in polysiloxane-based networks. The approach reported here is distinguished in that the material chemistry is readily amenable to surface alignment techniques. The facile nature of the material chemistry and the compatibility of these materials with directed self-assembly methods could further enable paradigm shifting end uses as designer substrates for flexible electronics or as actuating surfaces.

LCEs synthesized according to embodiments of the present invention are soft, anisotropic materials that exhibit large shape transformations when subjected to various stimuli. The methods described herein are a facile approach to enhance the out-of-plane work capacity of these materials by an order of magnitude, to nearly 20 J/kg. The enhancement in force output is enabled by the development of a room temperature polymerizable composition used both to prepare individual films, organized via directed self-assembly to retain arrays of topological defect profiles, as well as act as an adhesive to combine the LCE layers. The material actuator is shown to displace a load more than 2500 times heavier than its own weight.

Figure 9:
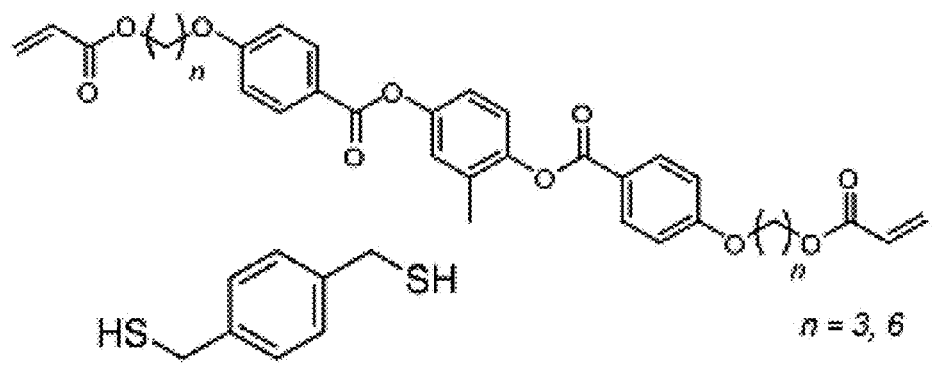
FIG. 9 is a schematic view of an exemplary dithiol chain transfer agent suitable for use in some embodiments of the present invention.
Figure 10:
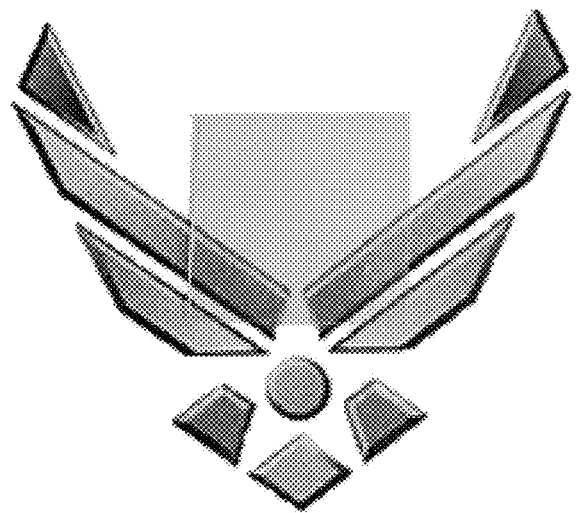
FIG. 10 is a photograph of the AIR FORCE logo with an LCE film prepared in accordance with an embodiment of the present invention placed thereon to demonstrate clarity of the film.

According to other embodiments, LCE films were formulated by mixing mesogenic diacrylates (RM82 and RM257) with a dithiol CTA (FIG. 9). The dithiol additive reduces the crosslink density of the polyacrylate via chain transfer (primary) and chain extension (secondary). The concentration of RM82 and RM257 may be selected to suppress the nematic-crystallization phase transition, producing a super-coiled mixture which was meta-stable (more than 1 hr) to −20° C. The film maintains the surface-induced alignment without crystallizing at room temperature, which would happen with conventional films comprising only one or the other monomer. The broad phase range enabled processing and photopolymerization to occur at room temperature. The LCE films may be optically clear or may have a low haze, such as is shown in FIG. 10. The glass transition temperature ($T_g$) of the LCEs prepared from this composition was 26° C. (FIGS. 11A and 11B), similar to prior reports. Local organization of the monomeric mixture was directed by photoalignment cells (PAAD-22, BEAM Co.). Various director profiles were imposed into the material to localize the orientation of the liquid crystalline monomers into topological defects, which are subsequently retained after photopolymerization.

Still other embodiments of the present invention are directed to effectively increasing a thickness of LCEs so as to increase work capacity. To do so, and according to another embodiment of the present invention, a plurality of films prepared in an accordance with embodiments here or according to a conventional manner; however, each film of the plurality should have similar, or in some embodiments, identical composition and director profile. The harvested films may then be arranged and registered such that the director profiles are in alignment. At least some of the harvested films may be coated with the mesogenic diacrylate composition used film formation prior to registration. The registered films may be secured (such as by clamping) and then heated until the mesogenic diacrylate coating is no longer hazy, and the films are cooled such that the mesogenic diacrylate coating takes on the residual surface alignment of the adjacent films. The films may then be cured, such as by a 365 nm UV light.

According to other embodiments, adhesives other than the mesogenic diacrylate mixture may be used, such as those that may be cured with 365 nm UV light.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1—Chain Transfer Synthesis

"C3M" (1,4-bis[4-(3-acryloyloxybutyloxy)benzoyloxy]-2-methylbenzene), "C6M" (1,4-bis-[4-(6-acryloyloxyhexyloxy)benzoyloxy]-2-methylbenzene), and "C11M" (1,4-bis[4-(11-acryloyloxyundecyloxy)-benzoyloxy]-2-methylbenzene) were purchased from Synthon Chemicals. "BDMT" (1,4-benzenedimethanethiol) was purchased from TCI America. Irgacure 651 (2,2-dimethoxy-2-phenylacetophenone) was donated by BASF. Elvamide-8023R was donated by DuPont. PAAD-22 was purchased from Beam Co.

C3M, C6M, and C11M were recrystallized from methanol prior to usage. All other materials were used as received unless otherwise noted.

Liquid crystal cells were prepared. Briefly, for cells patterned using rubbed surfaces, Elvamide was dissolved in methanol at 0.125 wt %. This solution was then spin-coated onto plasma-cleaned glass and rubbed with a felt cloth to introduce uniaxial alignment. For photoaligned cells, PAAD-22 in dimethylformamide (0.33 wt %) was spin-coated onto plasma-cleaned glass. The glass was then baked at 100° C. for 10 min.

For either cell type, two pieces of glass were glued together using Norland Optical Adhesive 65 mixed with 30 µm glass spheres to set the cell thickness. The adhesive was UV cured for 5 min. After cell fabrication, photoalignment was carried out by exposing the cell to 100 mW cm$^{-2}$ of 445 nm laser light. The s-polarized output of a DPSS laser was spatially filtered, apodized, and then passed through a twisted-nematic spatial light modulator (HoloEye LC-2002) to rotate the angle of linear polarization appropriately in each region. A more detailed description of the photopatterning process employed is reported in KOWALSKI et al., "Voxel resolution in the directed self-assembly of liquid crystal polymer networks and elastomers," Soft Matter, Vol. 13 (2017) 4335-4340, the disclosure of which is incorporated herein by reference, in its entirety.

LCE formulations includes mesogen C3M, C6M, or C11M blended with BDMT. Irgacure 651 was used as a photoinitiator in concentrations of 0.5 wt %, and all formulations were prepared under red light. Monomer mixtures were prepared in a vial and melted at about 150° C. while vortexing repeatedly. Melted formulations in the isotropic state were filled into a liquid crystal cell by capillary action at 100° C. The cell was then cooled to 10° C. below $T_{NI}$ of the monomer and allowed to rest for 5 min, which permitted nematic defects to relax and the monomer to take the order dictated by the surface. Samples were then polymerized using 365 nm UV light (ca. 150 mW cm$^{-2}$) at 10° C. below $T_{NI}$. Polymerization was carried out for 10 min, flipping the cell after 15 s and 5 min.

Initial compatibility screenings confirmed that alkyl dithiols generally had poor miscibility with C3M, C6M, and C11M. Hence, 1,4-benzenedimethanethiol was used. Unless otherwise noted, all chemical formulations and the resulting films are designated as CnM-XB, where n is a number of carbons between the mesogenic core and the acrylate moiety and X is the molar equivalent of BDMT.

Differential scanning calorimetry was performed on a TA Q1000. Samples were heated under $N_2$ from room temperature to 200° C., cooled to −40° C. and heated to 200° C. Heating and cooling rates were set to 10° C./min for the first heating cycle and 2° C./min for the second cycle. Data reported from the second heating cycle. The reported $T_g$ values were taken as the midpoint of the $C_p$ change.

Strain controlled transient tensile tests were conducted using the RSA III (TA Instruments). The prepared LCE films were cut into rectangular strips with the dimensions of 10 mm×2 mm×0.03 mm to ensure that the length was at least five-times greater than the width to minimize edge effects. At least five samples perpendicular to and parallel with the director were tested, and all mechanical data reported as the average ± the standard deviation. The tensile tests were conducted in an environmental chamber with the temperature set to 25° C. to ensure that the testing conditions were the same for each sample. A strain rate of 5% min$^{-1}$ was used. The strain to failure ($\varepsilon_f$), Young's modulus (E), and tensile stress at failure ($\sigma_f$) were calculated and reported according to ATSM Standard D638-14.

Real time FTIR (RTIR) measurements were performed on a FTIR (Nicolet iS50 FTIR, Thermo Scientific) at room temperature. Acrylate conversion was measured as the decrease in the area of the peak at 810 cm$^{-1}$. Thiol conversion was measured as the decrease in the area of the peak at 2570 cm$^{-1}$. Series scans were taken 1 scan per 0.83 sec. The samples were pressed in between sodium chloride plates. Light exposure was done with a 365 nm LED light (Omnicure LED 365 nm, LX 500).

A Rigaku Ultrax 18 using Cu Kα radiation was used to collect 2D wide angle X-ray scattering patterns. The sample was positioned 73 mm from the imaging plate. The beam was collimated with a pinhole collimator with a diameter of 0.2 mm. Azimuthal integration was utilized to determine the Hermans orientational order parameter. The background level was determined from featureless scattering from the 2θ scan.

3D profiles are obtained by first coating films in a thin layer of $TiO_2$ (Helling 3D Laser Scanning Anti-Glare Spray). Deformation of free-standing films was triggered by heating, and the resulting height profiles are measured in-situ using a structured-illumination 3D scanner (Keyence VR3200).

The gel fractions of the LCN/LCE films were determined as followed: five samples of each formulation (planar alignment, approximately 20 mm×10 mm×50 μm) were first dried under high vacuum overnight at 100° C. before recording the initial weight. Samples were then placed in 10 mL of dicholoromethane for 72 hrs before removal followed by drying at room temperature for 24 hrs. Samples were then dried at 100° C. and high vacuum for 24 hrs before measuring the final weight. Data is reported as the average ± the standard deviation.

The phase behavior of the monomer solution was investigated using polarizing optical microscopy with a heating stage.

The kinetics of radical initiated copolymerization of multi-thiol/di(meth)acrylate systems have been extensively studied. The two competing reaction pathways of thiol-mediated chain transfer and acrylate homopolymerization (chain growth) may be investigated by using real time infrared ("RTIR") spectroscopy to monitor the conversion of acrylate (C=C) and thiol (S—H) bonds.

Figure 11A:
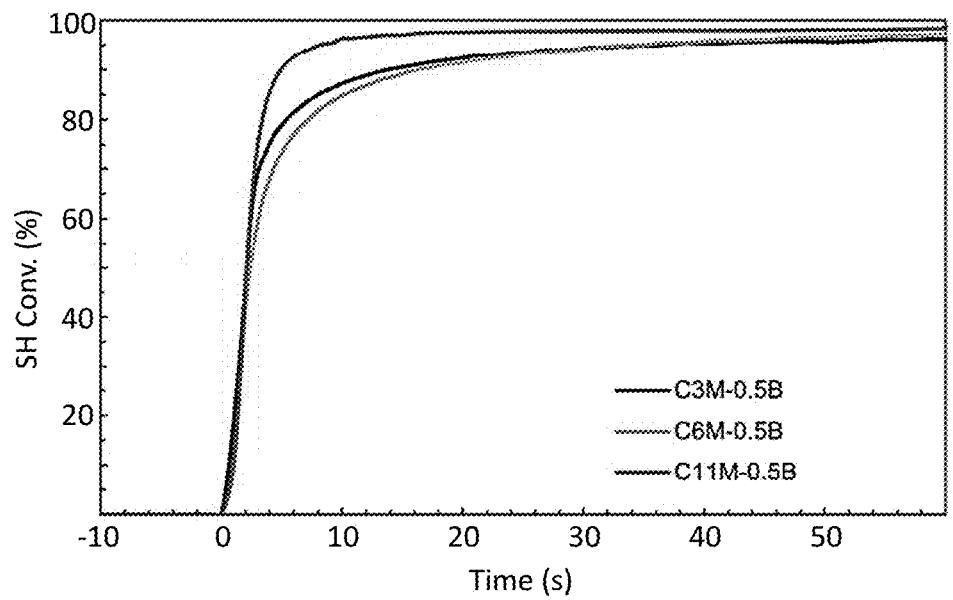
FIGS. 11A and 11B graphically illustrate the glass transition temperatures of LCEs prepared in accordance with embodiments of the present invention.
Figure 11B:
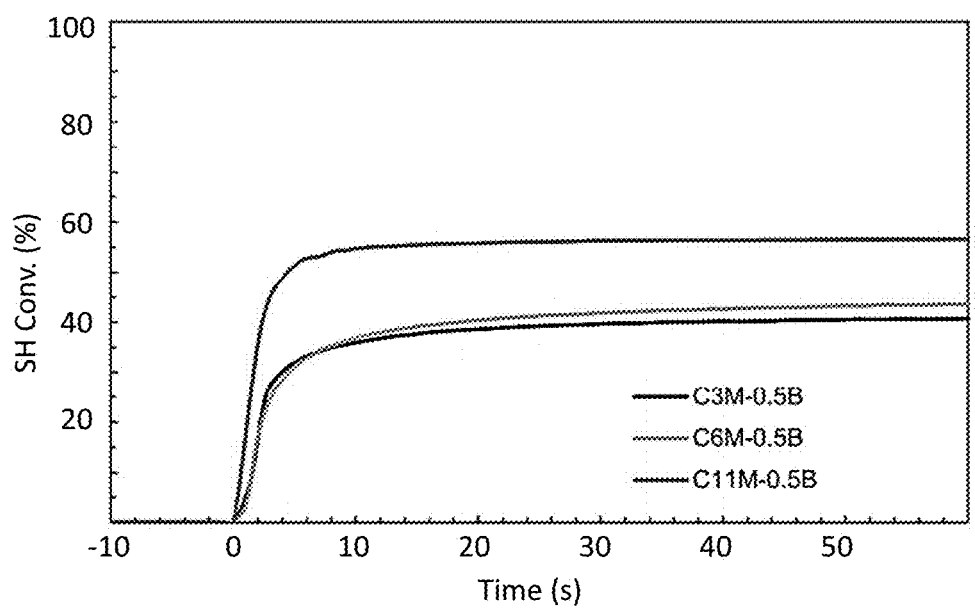
Figure 12:
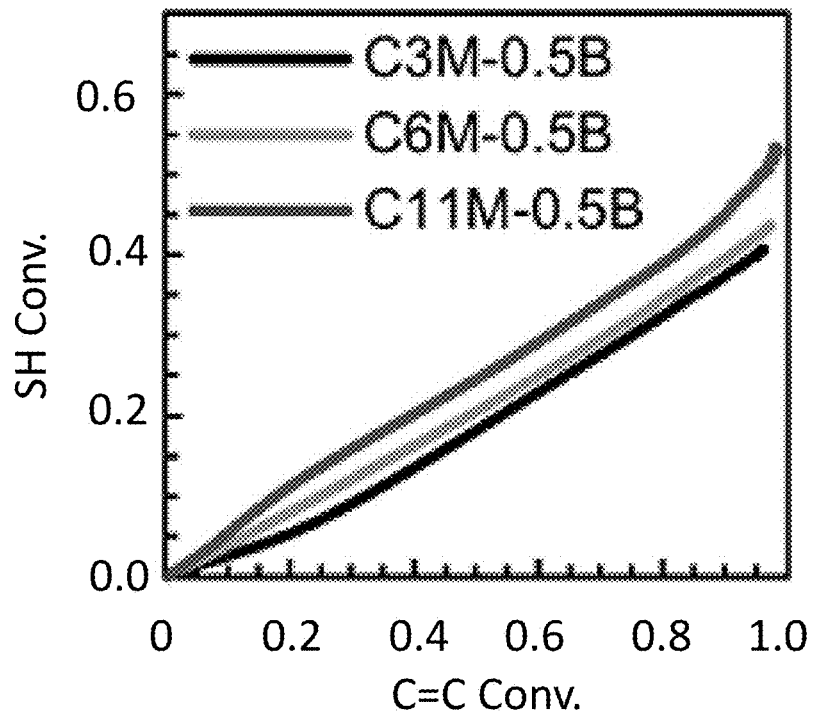
FIG. 12 graphically illustrates chain growth according to embodiments of the present invention.

The CnM-0.5B formulations showed near complete conversion of the acrylate groups within 60 sec of UV irradiation, but the conversion of thiol groups was much lower (40% to 55%, FIGS. 11A and 11B). Hence, chain growth occurs at a faster rate than chain transfer, which is consistent with similar nonmesogenic systems. As illustrated in FIG. 12, a ratio of acrylate-to-thiol functional groups converted with time showed similar trends regardless of the LCM carbon spacer employed. Therefore, differences in material properties arise from changes in cross-link density due to the spacer length as opposed to changes in acrylate reactivity.

Figure 13:
FIG. 13 is a photograph of the AIR FORCE logo with an LCE film prepared in accordance with an embodiment of the present invention placed thereon to demonstrate clarity of the film.
Figure 14:
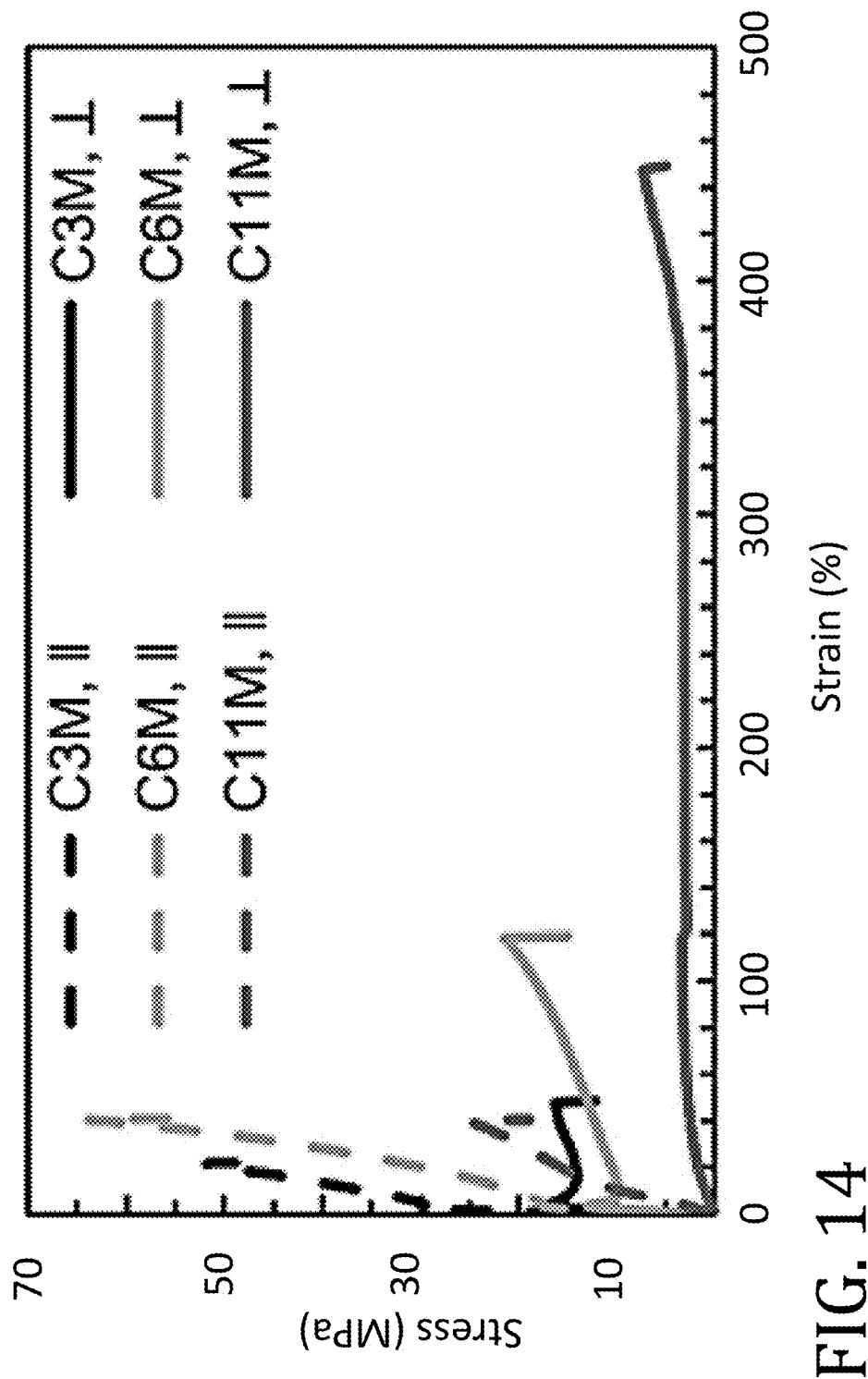
FIG. 14 graphically illustrates the anisotropic mechanical properties of LCE films prepared in accordance with embodiments of the present invention.

Monodomain samples were prepared in surface-aligned cells, enforcing planar alignment of the nematic director. Upon photopolymerization, all samples were optically transparent (FIG. 13) and demonstrated anisotropic mechanical properties (FIG. 14). The addition of 0.5 mol equiv of BDMT to either C3M, C6M, or C11M (9.5 wt % to 12.6 wt %) strongly influenced the mechanical properties of the LCEs. When the films were stretched parallel to the director, only slight increases in strains-to-failure ($\varepsilon_f$) were observed, and all films were fractured before 40% strain with a strain rate of 5% $min^{-1}$. Notably, the Young's modulus (E) decreased over an order of magnitude from 1250±80 MPa for C3M-0.5 to 92.9±7.5 MPa for C11M-0.5. This decrease in E is related to the increase in the molecular weight between cross-links attributable to the longer spacer length of C11M. Uniaxial extension perpendicular to the principal axis of the film demonstrated three distinct features as the spacer length was increased: (1) an exponential increase in $\varepsilon_f$ (51.3±10.1% to 445.1±13.3%), (2) a decrease in E of almost two decades (641±34 MPa to 9.1±1.0 MPa), (3) and a sizable decrease in the onset of the soft elastic plateau (15.2±0.6 MPa to 2.8±0.2 MPa). Complete listings of mechanical data and film characterization are given in Tables 1 and 2, below.

Figure 15A:
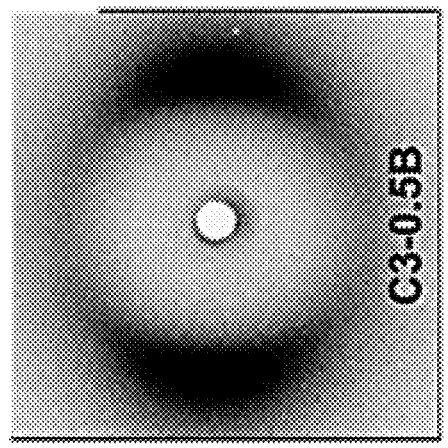
FIGS. 15A-15C are nematic diffraction patterns for LCE films prepared in accordance with embodiments of the present invention.
Figure 15B:
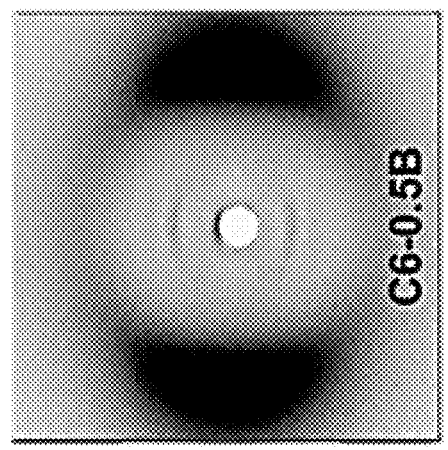
Figure 15C:
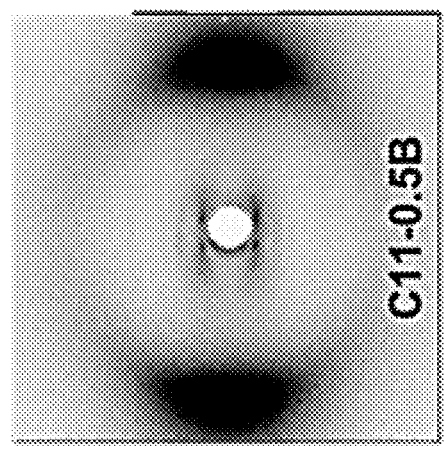

Adding a thiol-based CTA into commercially-available LCMs was a straightforward method to quickly and effectively generate robust LCEs with elastomeric properties that rival polysiloxane LCEs. The synthetic strategy detailed here does not employ timely oligomerization reactions that may not be amenable to industrial scale up. WAXS spectroscopy confirmed the retention of the characteristic nematic diffraction patterns for C3M-0.5B and C6M-0.5B (FIGS. 15A-15C) as well as provided evidence of a cybotactic nematic phase in C11M-0.5B. LCE films examined here did not exhibit crystallization over time as has recently been reported for similar material compositions.

TABLE 1

|  | $\sigma_p \parallel$ (%) | $\varepsilon_p \parallel$ (MPa) | E, $\parallel$ (MPa) | $\sigma_f$ (%) | $\varepsilon_f$ (MPa) | E (MPa) | Soft-elastic plateau (MPa) |
| --- | --- | --- | --- | --- | --- | --- | --- |
| C3M-0.5B | 46.9 ± 4.6 | 21.3 ± 1.6 | 1250 ± 80 | 51.3 ± 10 | 13.5 ± 1.1 | 641 ± 34 | 15.2 ± 0.6 |
| C6M-0.5B | 66.4 ± 6.9 | 38.3 ± 2.4 | 697 ± 13 | 127 ± 20 | 22.0 ± 4.6 | 419 ± 18 | 13.6 ± 0.6 |
| C11M | 42.9 ± 1.8 | 9.72 ± 0.84 | 725 ± 18 | 76.2 ± 5.5 | 16.5 ± 1.0 | 260 ± 11 | 14.1 ± 0.5 |
| C11M-0.25B | 56.4 ± 6.7 | 22.7 ± 1.5 | 380 ± 14 | 374 ± 11 | 10.2 ± 1.3 | 76.9 ± 7.5 | 6.79 ± 0.85 |
| C11M-0.5B | 25.9 ± 3.0 | 37.8 ± 3.9 | 92.9 ± 7.5 | 445 ± 13 | 7.2 ± 2.2 | 9.13 ± 1.0 | 2.85 ± 0.19 |
| C11M-0.75B | 6.87 ± 0.41 | 43.5 ± 1.7 | 56.9 ± 3.6 | 486 ± 20 | 1.52 ± 0.23 | 3.99 ± 0.39 | 0.888 ± 0.078 |
| C6M-C11M-1B | 25.5 ± 3.2 | 47.3 ± 1.7 | 59.6 ± 1.7 | 437 ± 29 | 2.71 ± 0.88 | 3.76 ± 0.46 | 1.26 ± 0.14 |

TABLE 2

|  | $T_{NI}{}^a$ (° C.) | $T_g{}^b$ (° C.) | S $^c$ | Gel Fraction (%) |
| --- | --- | --- | --- | --- |
| C3M-0.5B | 112.5 | 44.2 | 0.31 | 97.9 ± 1.0 |
| C6M-0.5B | 105.0 | 31.3 | 0.43 | 97.8 ± 1.2 |
| C11M | 104 | 43.1 | 0.39 | 99.3 ± 0.6 |
| C11M-0.25B | 88.0 | 30.4 | 0.45 | 97.4 ± 1.2 |
| C11M-0.5B | 76.5 | 8.1 | 0.48 | 96.0 ± 0.6 |
| C11M-0.75B | 63.0 | −1.5 | 0.51 | 91.3 ± 2.3 |
| C6M-c11M-1B | 53.5 | 8.4 | 0.52 | 98.9 ± 0.2 |

Where (a) was determined by polarized optical microscopy with second cooling at 1° C./min; (b) was determined by scanning calorimetry with second cooling at 2° C./min; and (c) was determined by Wide Angle X-ray Scattering ("WAXS").

Figure 16:
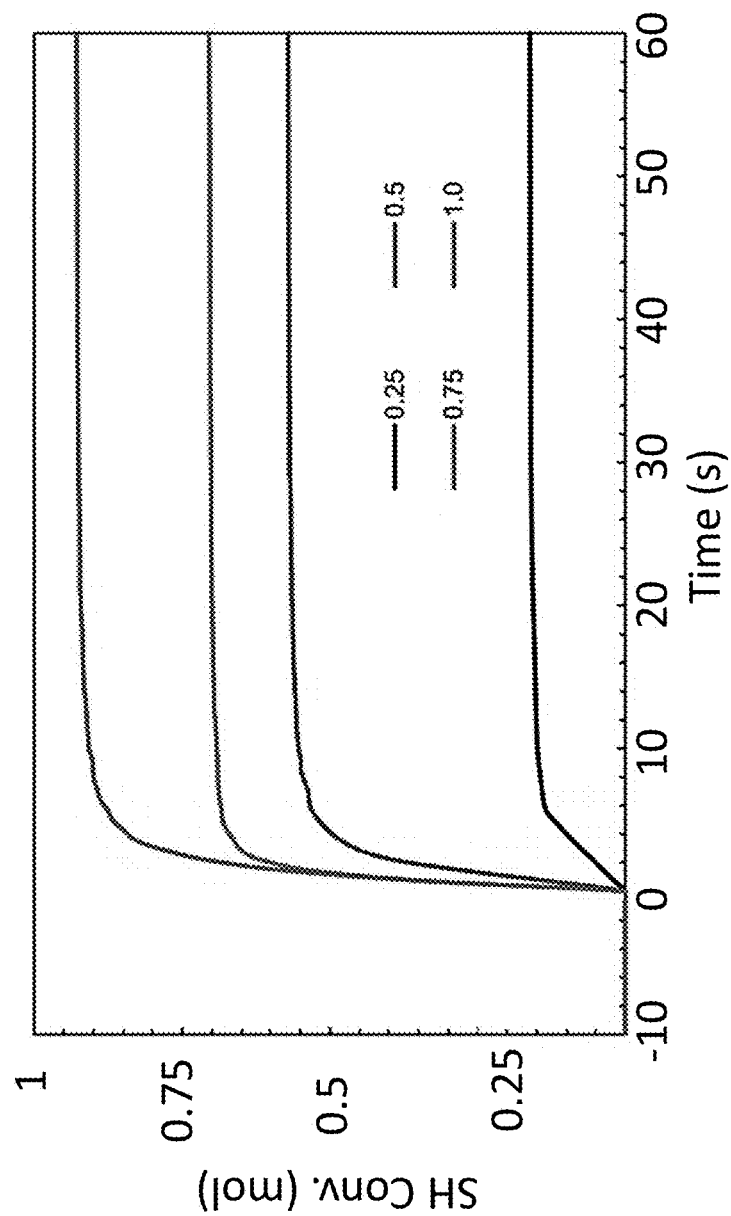
FIG. 16 graphically illustrates RTIF data demonstrating an increase in thiol incorporation with increase BDMT loading.
Figure 17:
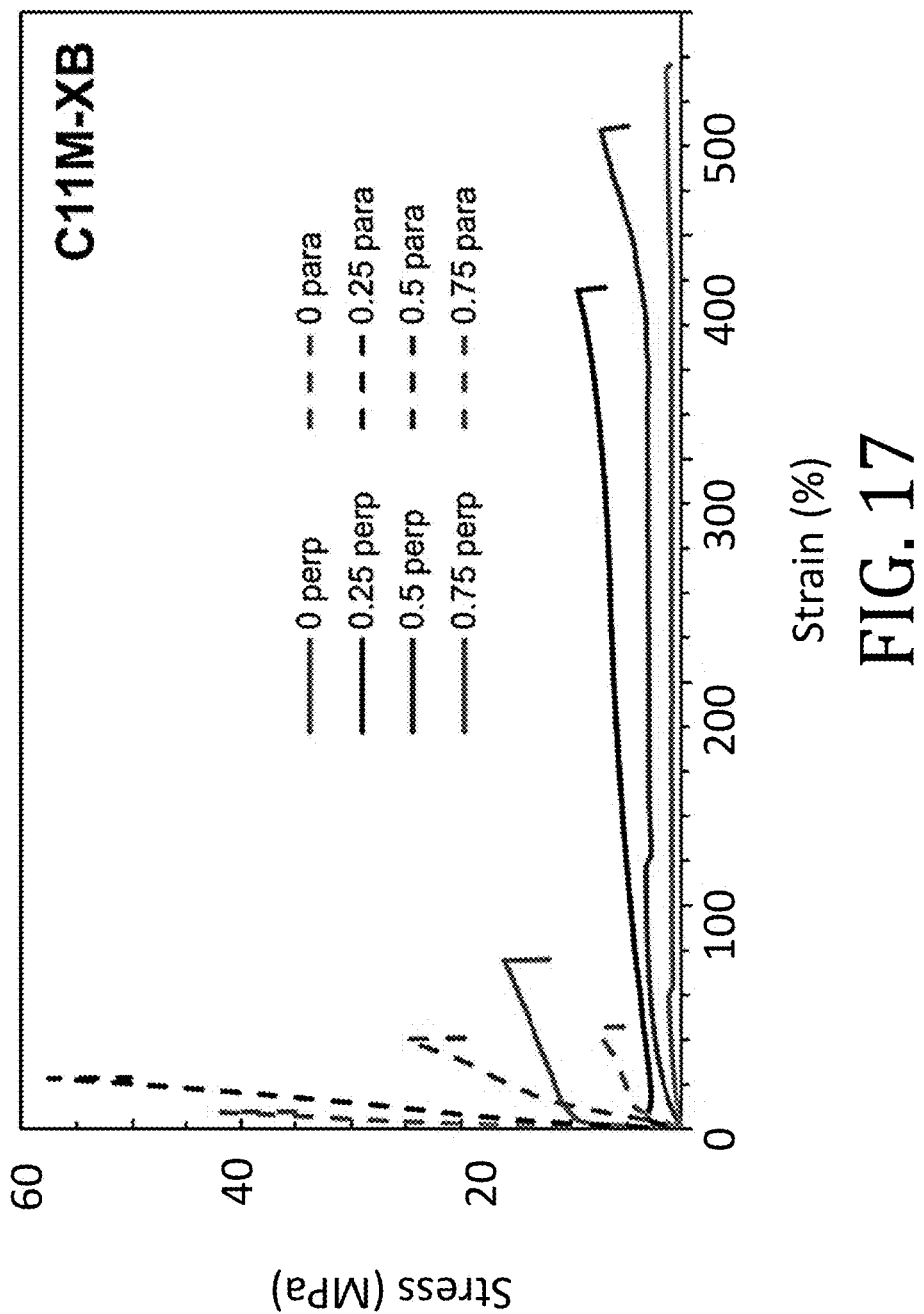
FIG. 17 graphically illustrates the fracturing of LCE films prepared in accordance with embodiments of the present invention.

The ratio of BDMT was varied to further explore the utility of CTAs in the fabrication of LCEs. Films were prepared with 0 mol equiv, 0.25 mol equiv, 0.5 mol equiv, and 0.75 mol equiv of BDMT (C11-XB). The polymerization of C11M with an equimolar amount of BDMT (C11M-1B) did not result in a cohesive, free-standing film. RTIR showed an increase in thiol incorporation within the LCE as the BDMT loading was increased (FIG. 16), and all films fractured before 45% strain (FIG. 17) upon elongation parallel to the director.

Figure 18:
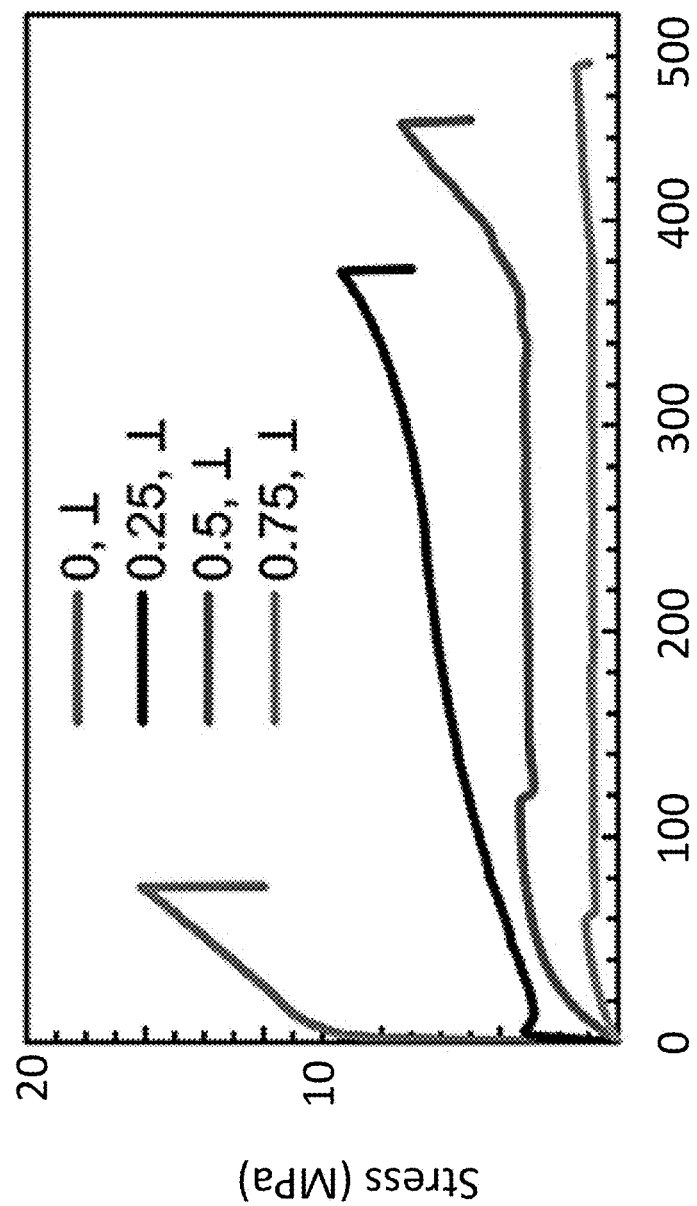
FIG. 18 graphically illustrates the mechanical response of LCE films prepared in accordance with embodiments of the present invention.
Figure 20A:
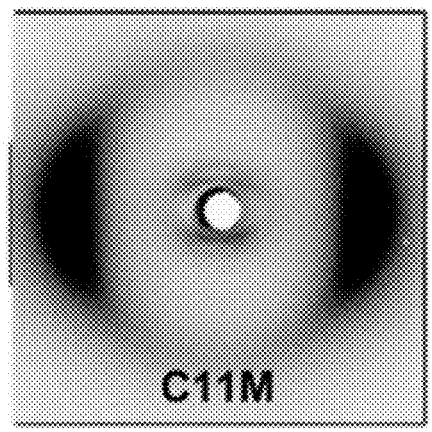
FIGS. 20A-20D are exemplary images of WAXS diffraction of LCE films prepared in accordance with embodiments of the present invention.
Figure 20B:
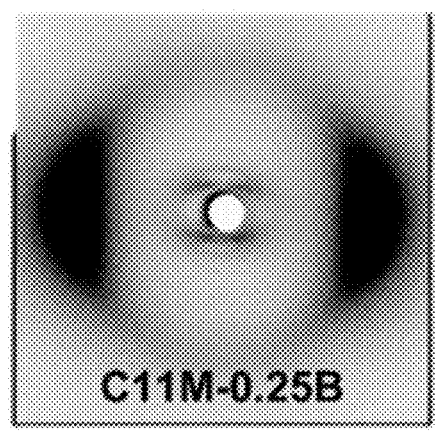
Figure 20C:
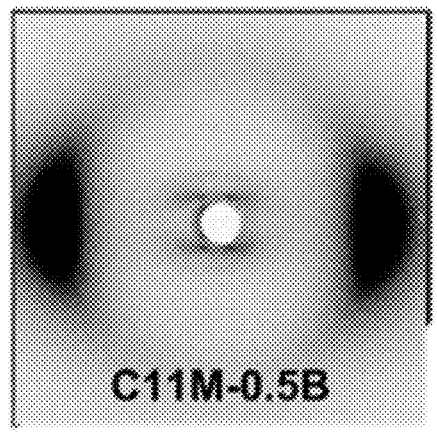
Figure 20D:
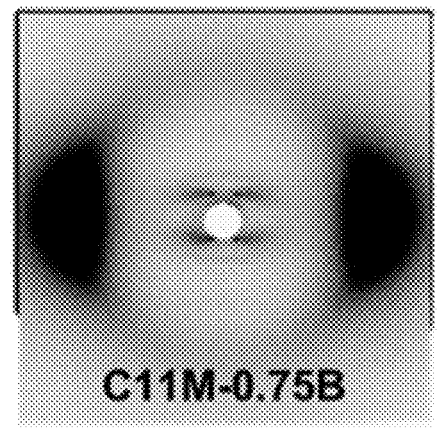

The influence of the CTA concentration on the resulting mechanical response of C11M-XB films is illustrated in FIG. 18, which plots the strain measured in response to an applied stress with the nematic director oriented perpendicular to stretch direction. Increasing the CTA concentration dramatically affects the soft elasticity of the LCEs, both in the threshold stress and range for which soft elasticity is observed. For comparison, neat C11M films exhibit a linear elastic response until $\varepsilon=5\%$ before yielding. The nonlinear response after the yield point is likely due to mesogens attempting to rotate, but the high cross-link prevents complete reorientation. The addition of 0.25 mol of BDMT (5.0 wt %) increased $\varepsilon_f$ by 300% and C11M-0.25B maintains a semisoft elastic plateau, unlike C11M. The semisoft elastic response of C11M-0.25B indicates incomplete mesogen reorientation.

Increasing the concentration of BDMT within the network further resolves the soft-elastic plateau and increases the fracture strain to 486±20% (C11M-0.75B). Increasing the concentration of BDMT also lowers the modulus from 260±11 to 4.0±0.4 MPa for neat C11M and C11M-0.75B, respectively.

Glassy liquid crystalline networks prepared from diacrylate LCMs produce films with high optical clarity and birefringence. FIGS. 19A and 19B show typical C11M-0.5B film and demonstrate the birefringence associated with the fabricated LCEs. Maintaining a concentration of BDMT below about 15 wt % yielded materials with optical properties rivalling LCN films prepared from the neat LCM and elastic deformation that rival polysiloxane LCEs. The WAXS spectra for C11M-XB films all showed anisotropic diffraction patterns with distinctive diffuse, four-point "eyebrow" patterns that are characteristic of a cybotactic packing of the nematic phase (FIGS. 20A-20D). C11M-XB films also exhibited a decrease in the $T_g$ and gel fraction with the corresponding decrease in cross-link density (Table 2, above).

Figure 21:
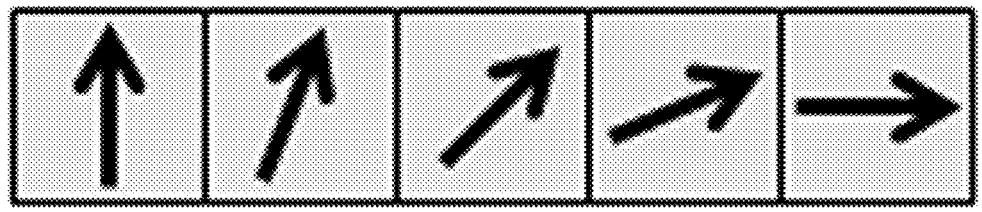
FIG. 21 is a schematic illustrating surface alignment voxels for films prepared in accordance with embodiments of the present invention.

The material chemistries according to embodiments of the present invention are readily amenable to surface alignment, which are illustrated in FIG. 21, where a film was prepared with director orientation varied by 22.5° per voxel across a length of the film. The effect of director orientation on the local elastic properties of the film may be observed in the birefringence changes of each region when the film is placed under cross polarizers (FIG. 22). Deformation of the material and its influence on the local orientation within each voxel are apparent in FIGS. 23A-23D. The mesogens aligned parallel to the force direction exhibit linear elastic behavior under uniaxial tensile strain while the other regions exhibit increasing degrees of soft elastic behavior.

Figure 24:
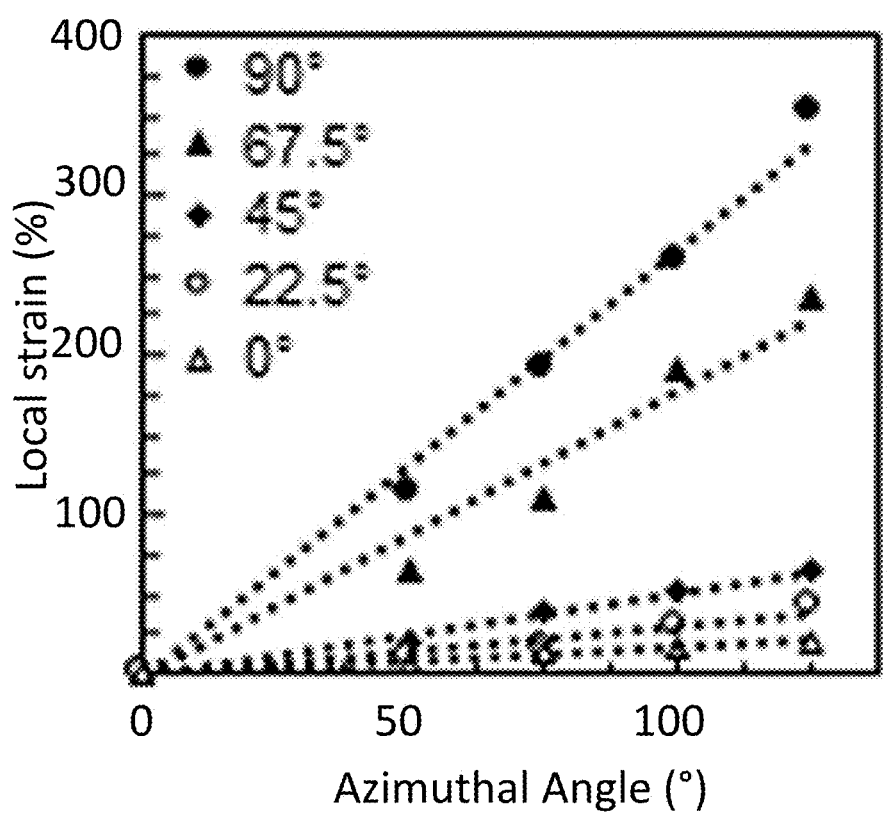
FIG. 24 graphically illustrates localization of strain within the film illustrated in FIGS. 23A-23D.

C11M-0.5B films were globally elongated to 125%, and the localization of strain within each region of the LCE film is shown in FIG. 24. For each variation of 22.5° in orientation, there is a corresponding increase in the local strain that is associated with the amount that the mesogens within each region are able to reorient. The maximum contrast ratio between perpendicular and parallel director profiles is about 19.

Figure 25:
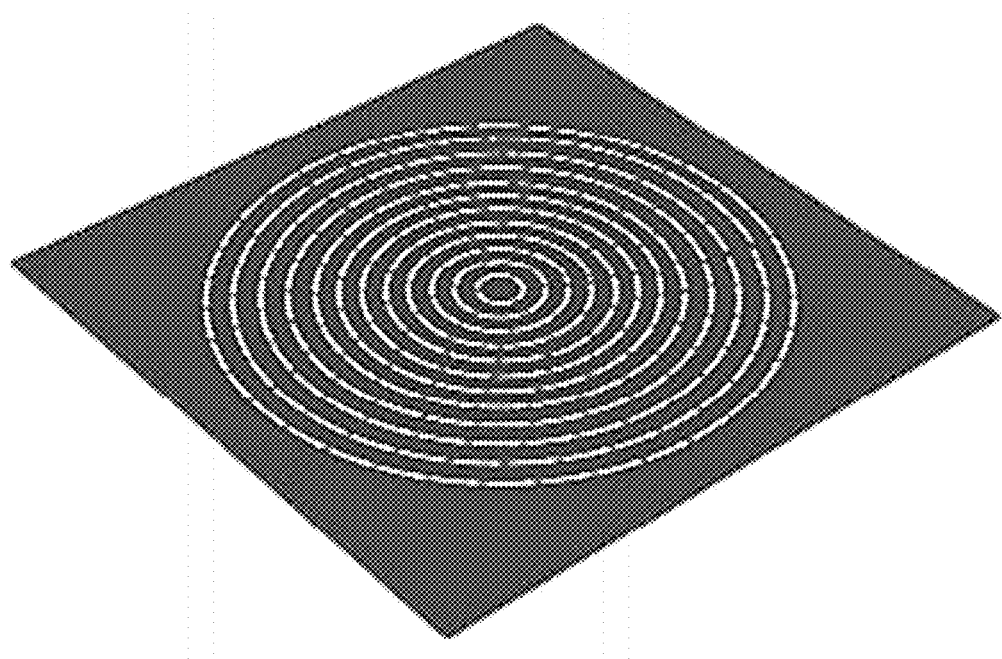
FIG. 25 is a schematic representation of a +1 azimuthal defect configured to uniformly deform a film into a conical shape upon heating.

The C11M-0.5B LCEs were organized into a director field described as a +1 azimuthal defect (FIG. 25) which will uniformly deform into a conical shape upon heating. Removal of the LCE film from the alignment cell and cooling to room temperature caused the film to spontaneously deform into an anticone (saddle) geometry (FIGS. 26A-26D). The presence of the anticone was the result of the elevated polymerization temperature used to prepare the C11M-0.5B film (65° C.). Cooling the materials to room temperature (25° C.) may result in a slight increase in the nematic order, inducing local average length changes within the network which manifests as residual strain.

Figure 27:
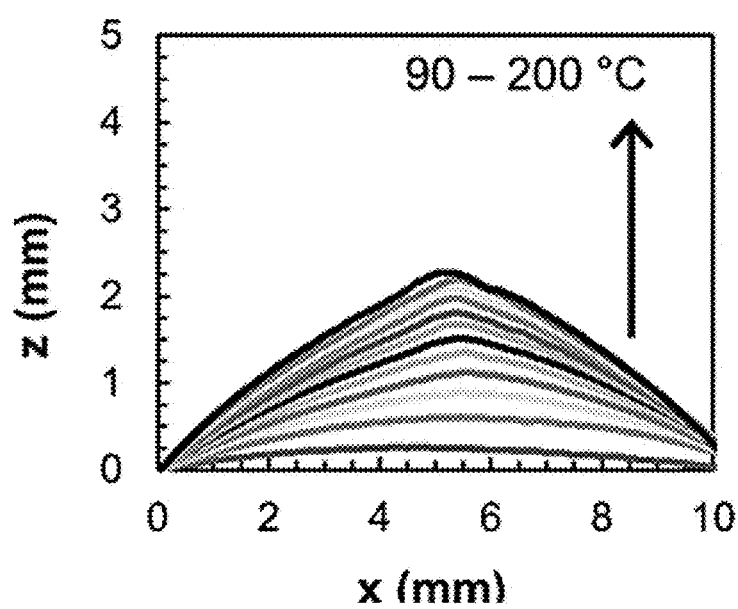
FIG. 27 graphically represents a cross-sectional profile of the film of FIGS. 26A-26D.
Figure 26A:
FIGS. 26A-26D are images of a film prepared with the +1 azimuthal defect of FIG. 25.
Figure 26B:
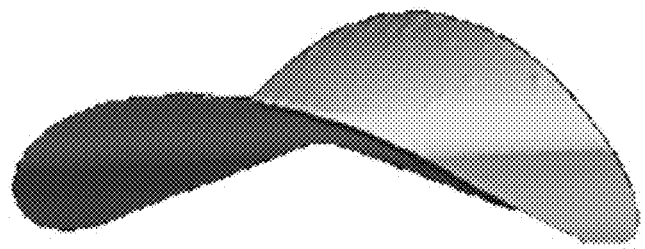
Figure 26C:
Figure 26D:
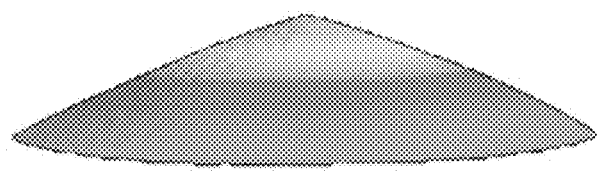

An optical profilometer was used to quantify the 3D shape transformation of C11M-0.5B (FIGS. 26A-26D). Heating the film reduced the nematic order and allowed the sample to return to a flat state. Increasing the temperature further produces the expected conical shape. FIG. 27 plots a cross-sectional cutout of the profile of the film to illustrate the shape transformation with the corresponding increase in temperature. The LCE film prepared from C11M-0.5B transforms from negative Gaussian curvature to flat and ultimately to positive Gaussian curvature by simply changing the temperature.

Figure 28:
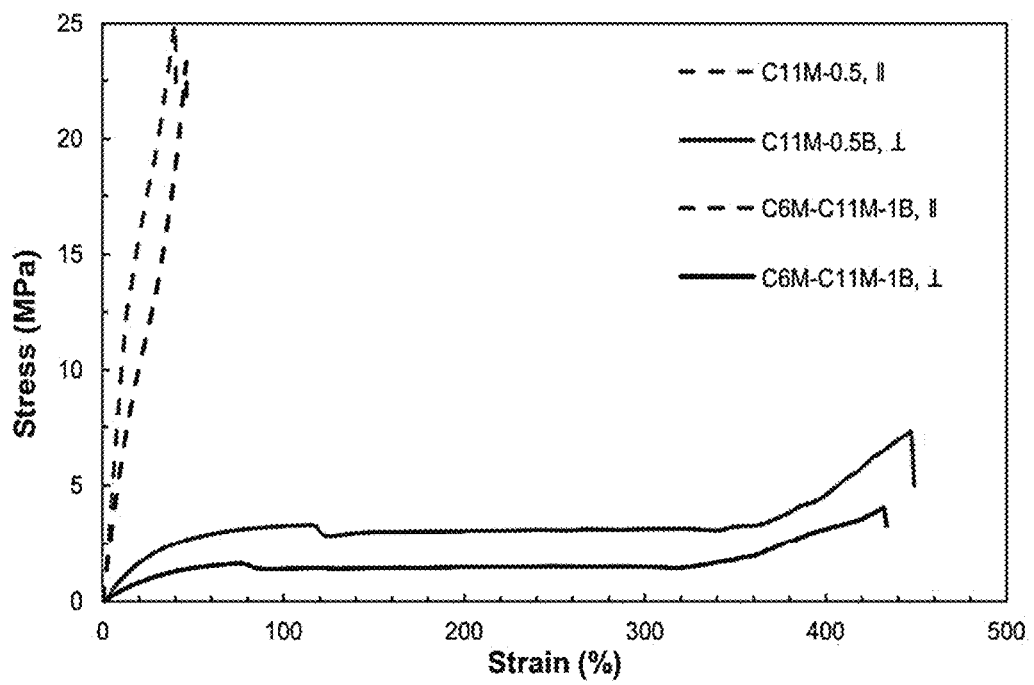
FIG. 28 graphically represents stress and strain of films prepared in accordance with embodiments of the present invention.
Figure 30:
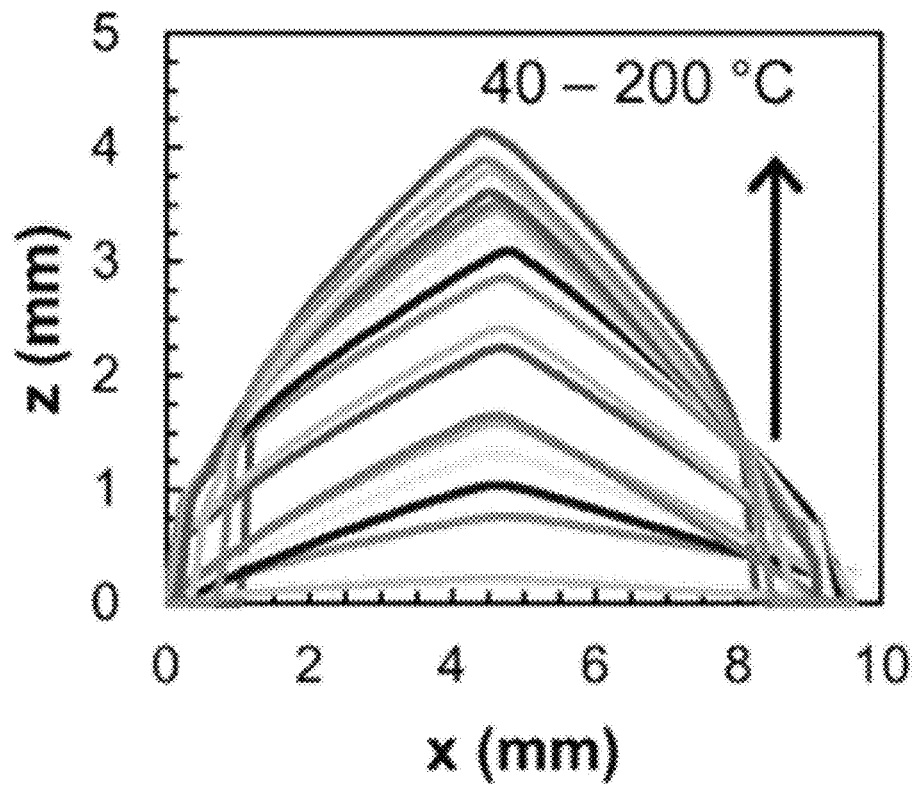
FIG. 30 graphically represents a cross-sectional profile of the film of FIGS. 29A-29D.
Figure 29A:
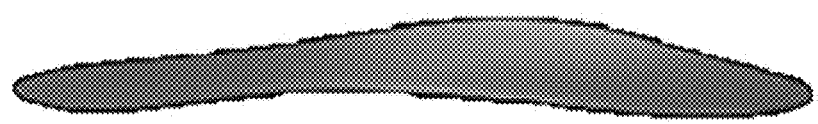
FIGS. 29A-29D are images of a film prepared in accordance with embodiments of the present invention.
Figure 29B:
Figure 29C:
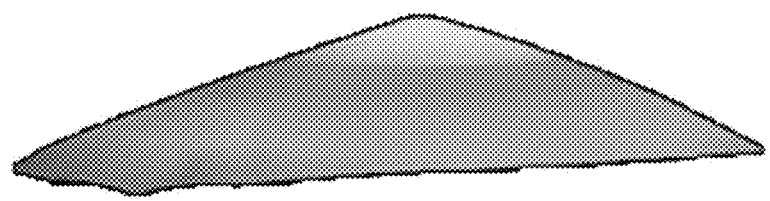
Figure 29D:
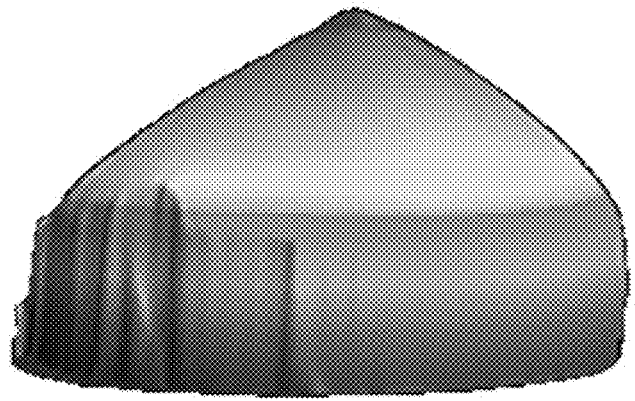
Figure 31:
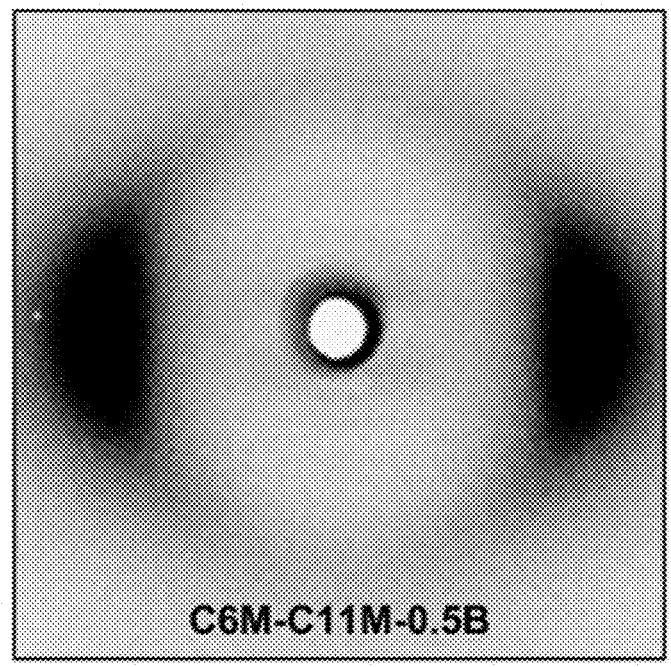
FIG. 31 is an exemplary image of WAXS diffraction of the LCE film of FIGS. 29A-29D.

In certain applications, however, it may be preferred that the room temperature form be flat and not curved. Leveraging the tremendous formulation flexibility inherent to this synthetic approach, a new LCE formulation (C6M-C11M-1B) was prepared that is nematic at room temperature (25° C.). Surprisingly, planar, monodomain C6M-C11M-1B films display lower E and soft-elastic plateaus than C11M-0.5B, but also exhibit comparable total elongation (Table 1 and FIG. 28) even though the material is composed of LCMs with various spacer lengths. When photopolymerized in a +1 azimuthal defect director profile, the resulting LCE is virtually flat, with an almost imperceptible anticone curvature at slightly below room temperature (20° C., FIG. 29A). The film completely flattens out when heated to 40° C. (FIG. 29B), and further heating to 200° C. (FIG. 29D) results in a cone with a "circus tent" shape with a quantifiable diameter contraction (FIG. 30). This formulation is absent the cybotactic nematic phase seen in the WAXS diffraction (FIG. 31) for seen in C11M-XB samples.

Example 2

The LCE films examined here were formulated by mixing mesogenic diacrylates (RM82 and RM257) with a dithiol CTA (FIGS. 1-3). RM82 (1,4-bis-[4-(6-acryloyloxyhexyloxy)benzoyloxy]-2-methylbenzene) and RM257 (1,4-Bis-[4-(3-acryloyloxypropyloxy)benzoyloxy]-2-methylbenzene) were purchased from Synthon Chemicals, and recrystallized from methanol before use. LCE formulations were prepared by adding 69 wt % RM82, 20 wt % RM257, 11 wt % BDMT (benzenedimethanethiol, Sigma Aldrich), with 1 wt % Irgacure 651 (BASF), and 0.5 wt % butylated hydroxytoluene to a glass vial and thoroughly mixed. The concentration of RM82 and RM257 in the mixture was selected to suppress the nematic-crystallization phase transition, producing a supercoiled mixture which was metastable (more than 1 hr) to −20° C.

50 μm thick liquid crystal cells, prepared as described above were filled via capillary action at 90° C. in the isotropic state and cooled slowly to 25° C. over 5 min. The cells were then exposed to 365 nm UV (120 mW/cm$^2$) light for 20 min to initiate photopolymerization.

Figure 32A:
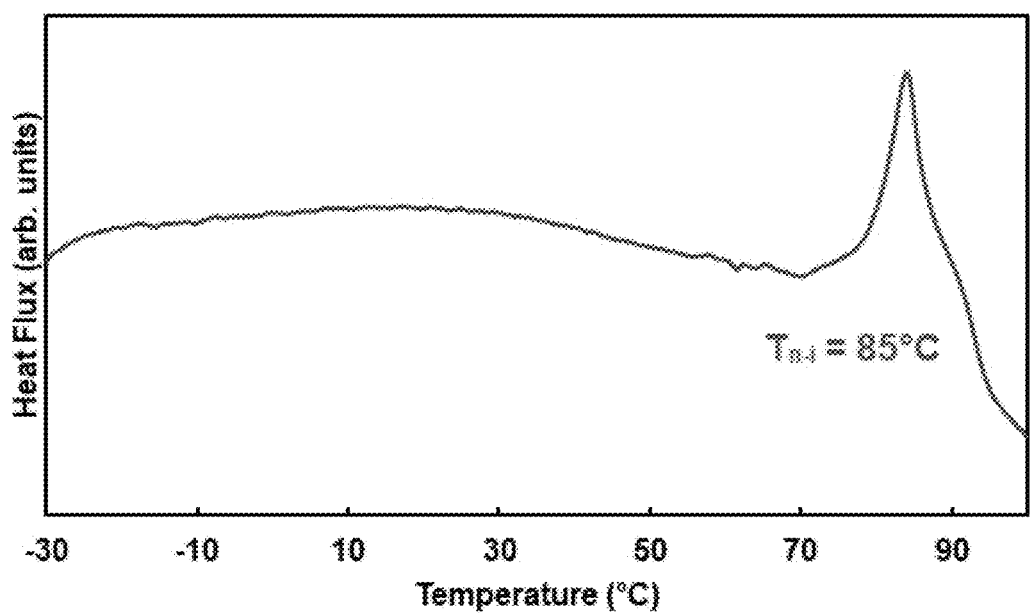
FIGS. 32A and 32B graphically represent glass transition temperatures for films prepared in accordance with embodiments of the present invention.
Figure 32B:
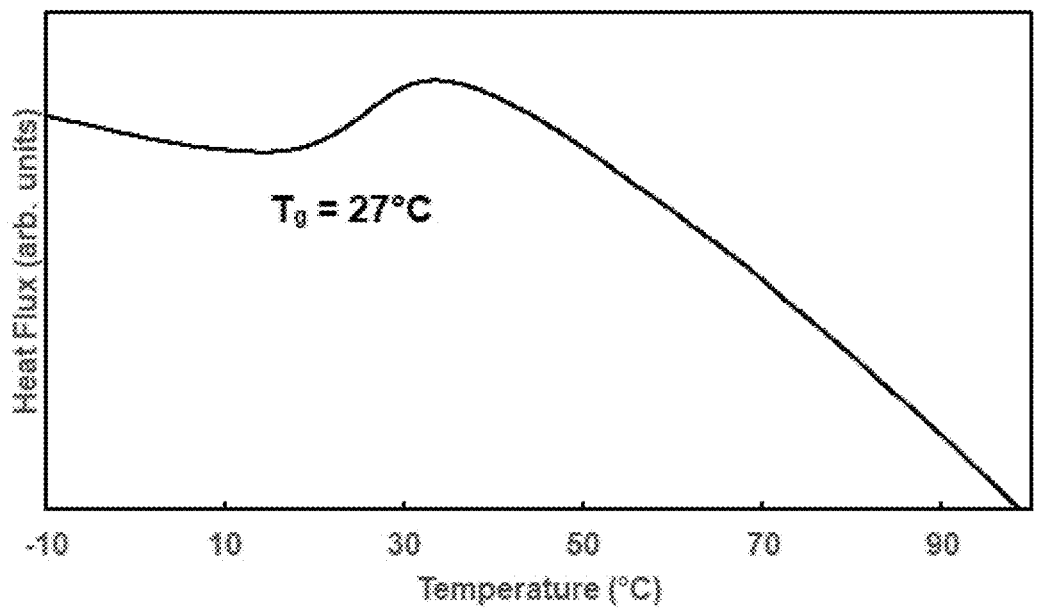

The broad phase range enabled processing and photopolymerization to occur at room temperature. The LCE films are optically clear. The glass transition temperature ($T_g$) of the LCEs prepared from this composition was 26° C., (FIGS. 32A and 32B) similar to prior reports. Local organization of the monomeric mixture was directed by photoalignment cells (PAAD-22, BEAM Co.). Various director profiles were imposed into the material to localize the orientation of the liquid crystalline monomers into topological defects, which are subsequently retained after photopolymerization.

An approach to increase the work capacity of these material systems was to increase the thickness of the LCEs.

However, the physics of surface anchoring and the anchoring strength of the photoalignment layer limit the maximum thickness for retention of surface-induced director profiles to about 50 μm.

Figure 33:
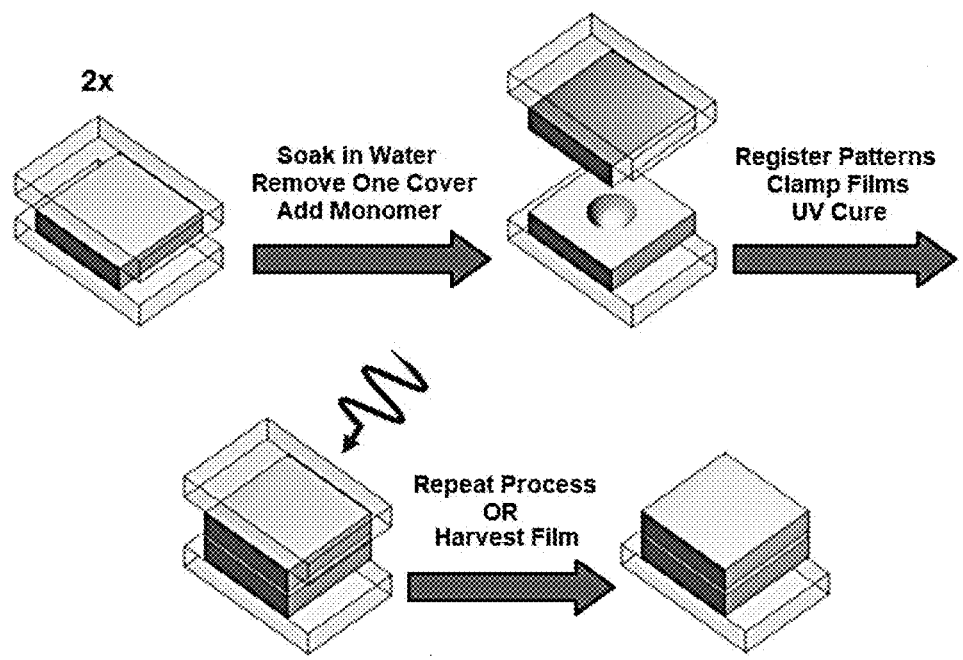
FIG. 33 schematically represents a step-wise process of layering films in accordance with an embodiment of the present invention.

Referring to FIG. 33, and after polymerization and under crossed polarizers, two LCE films were harvested by soaking the cells in deionized water for 2 hrs. Care was taken to deconstruct the cells in a manner such that LCE films adhere to one of the glass substrates, to prevent wrinkling. Two films, both adhered to a single glass substrate, were placed on a hot plate at 50° C. A drop of the LCE formulation was placed on one of the films, and the films clamped together. The films were briefly heated using a 100° C. heat gun until the adhesive layer was no longer hazy, and then allowed to cool to 25° C. over 5 min. The adhesive was cured with 365 nm UV light for 20 min. The process was repeated until the desired number of layers was achieved.

From this two layer laminate, additional layers may be added to realize up to 300 μm thick LCE laminates examined here. Due to the consistency in the materials chemistry acting as both the LCE layer and adhesive, no delamination was observed.

Phase transitions, birefringence, and film quality were measured via polarized optical microscopy ("POM") (Nikon) in transmission mode, and the temperature was controlled by a Mettler Toledo HS82 heat stage. Shape change of homogenous planar films, floating on silicone oil and 5 μm glass spacers, as a function of temperature was also determined using POM. Dynamic scanning calorimetry ("DSC") (TA Instrument Q1000) was performed under nitrogen from −40° C. to 120° C. for monomer mixtures and 0° C. to 300° C. for cured films in hermetically sealed pans at 2° C./min. The nematic transition determined from the peak of the heat flux trace on second cooling, and the glass transition was determined from the peak of the derivative of the heat flux trace. Shape of actuated samples was measured through structured-illumination optical profilometry (Keyence VR-3200).

To measure lifting force and stroke of the actuation, 1 cm×1 cm samples were placed on a resistive heater, loaded with weight, and heated to 180° C. The samples were loaded with successively heavier tungsten weights, glass slides, or both after each test, and the height was measured by a CCD camera at the plane of the films. A ruler was always imaged frame and plane to calibrate the distance, and the film displacement was measured using ImageJ. All tests were performed by loading the sample and then heating.

Figure 34A:
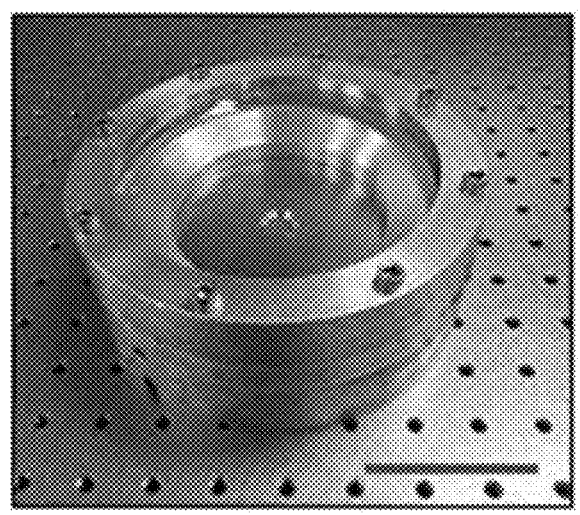
FIGS. 34A and 34B are images of a pressure chamber configured to measure actuation of a film prepared in accordance with an embodiment of the present invention.
Figure 34B:
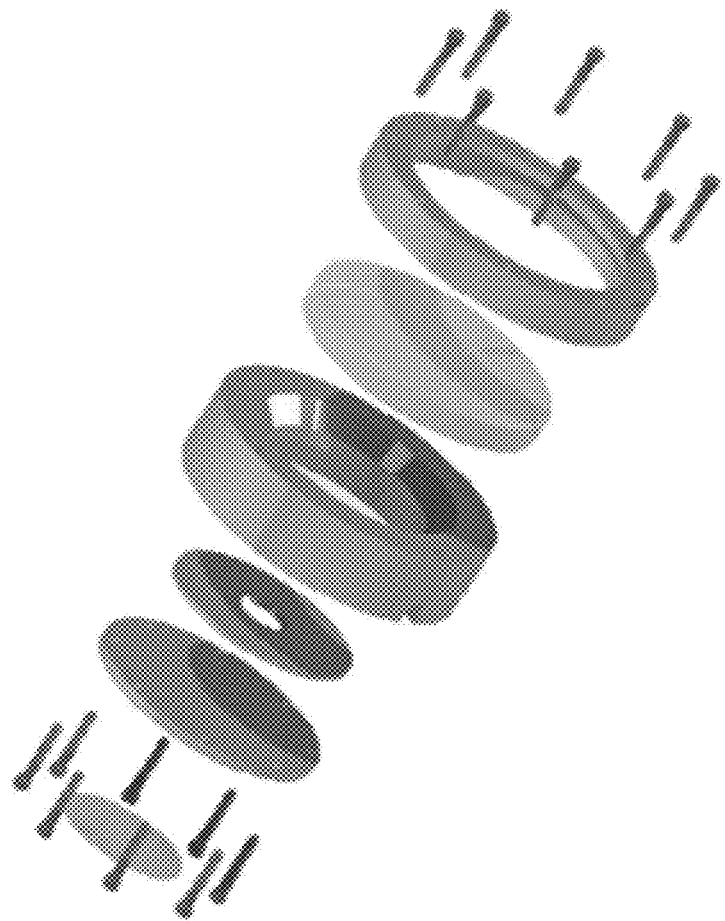
Figures 35A, 35B:
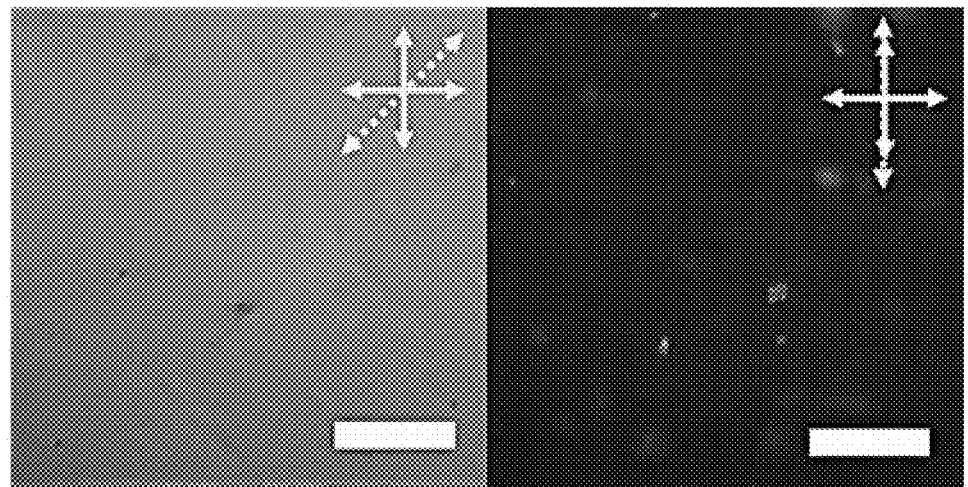
FIGS. 35A-35F are polarized microscopic images of multiple film layers prepared in accordance with embodiments of the present invention.
Figures 35C, 35D:
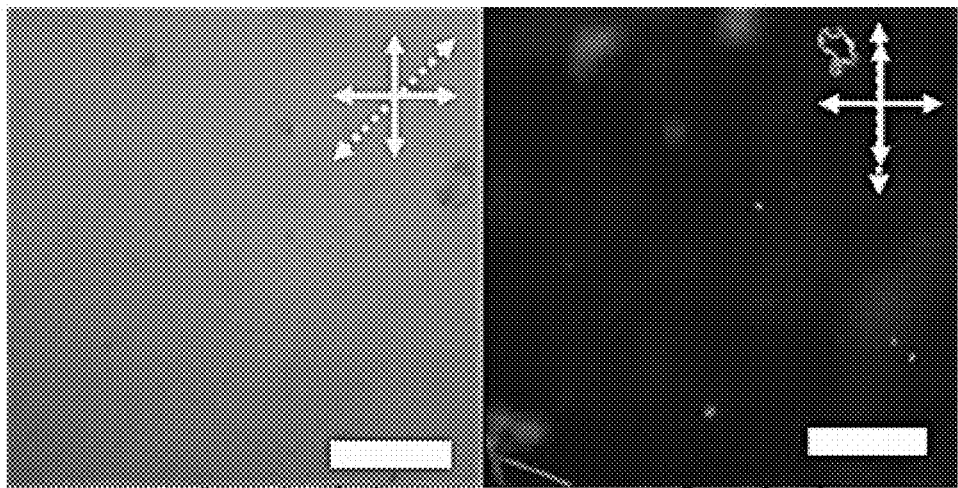
Figures 35E, 35F:
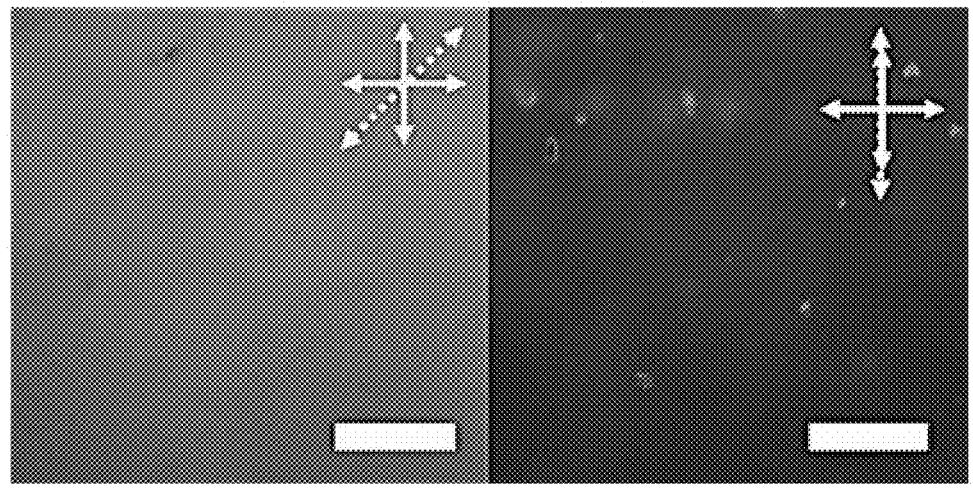

Actuation under pressure was measured using a homebuilt pressure chamber (FIG. 34A), and the resultant shape change monitored in situ via optical profilometry. The sample was placed in the central hole, with a series of small holes cut out under the sample to allow the back to be exposed to ambient pressure. An exploded drawing is displayed in FIG. 34B. The chamber was heated to 100° C. using resistive heating silicone elements and allowed to equilibrate for 30 min at 100° C. The chamber was then pressurized until the films collapsed. The shape change was monitored every 0.2 psi.

Figure 36:
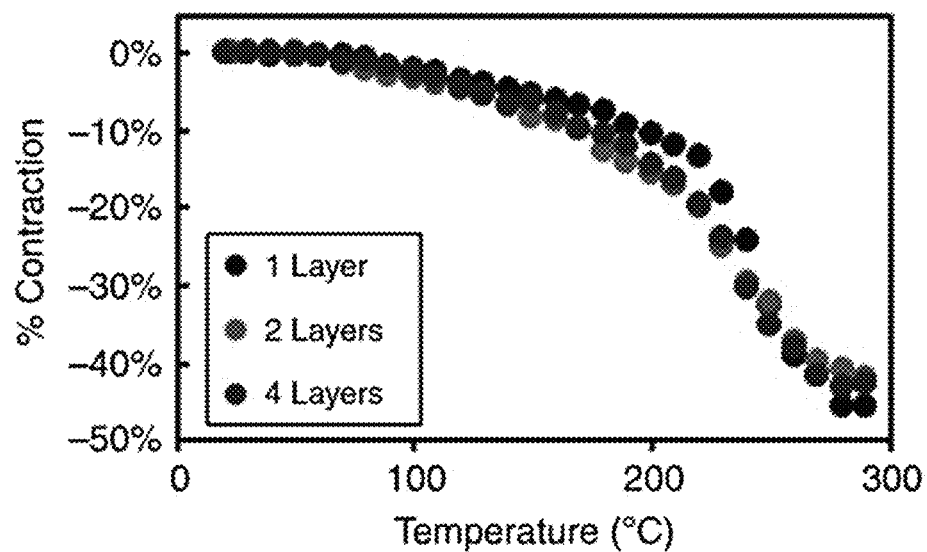
FIG. 36 graphically illustrates thermally-induced contraction of a single film layer, a double film layer laminate, and a four film layer laminate.

The orientation of the laminated films was confirmed with polarized microscopy to confirm the registry of the LCE layers and that the adhesive layers are taking on the order of the LCE surfaces (FIGS. 35A-35F). The thermally induced contraction (FIG. 36) of the uniaxially aligned LCEs was nearly identical for a single layer, double layer, and four layer laminates. The contraction measured was determined from dimensional changes observed in the LCE films upon heating.

Figure 37:
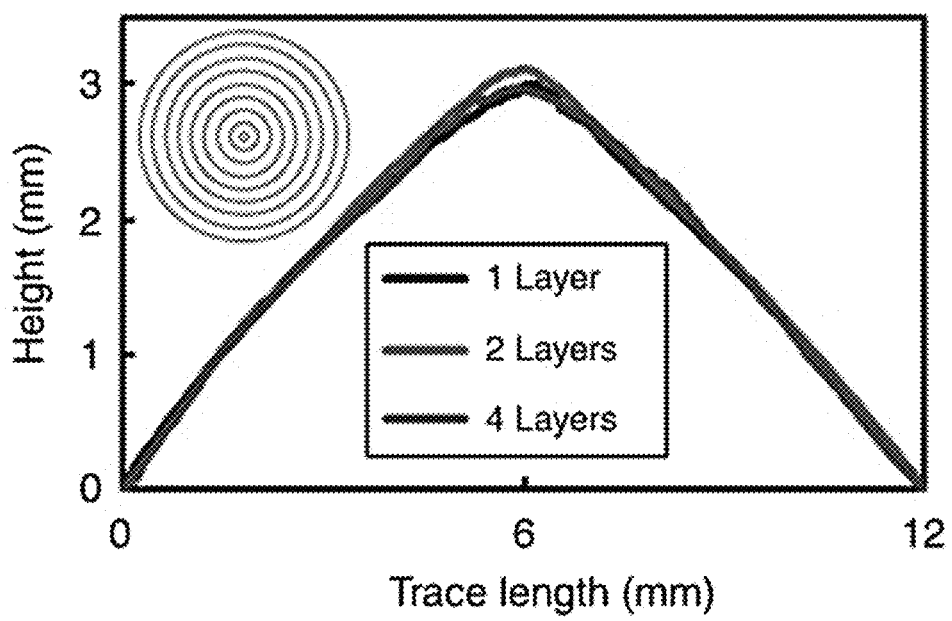
FIG. 37 graphically illustrates a cross-section profile of a single film layer, a double film layer laminate, and a four film layer laminate.

When heated, nematic LCEs reversibly contract along the liquid crystalline director and expand in the orthogonal directions. This anisotropic contraction, when subject to spatial variation dictated by the directed self-assembly of localized surface alignment, may result in dramatic out-of-plane shape deformation. A well-understood and predictable director profile, the azimuthal +1 topological defect, was used. The director profile is inset in FIG. 37, where the mesogens organize in concentric rings around a central region (point defect). This pattern was predicted and experimentally confirmed to deform into a cone upon heating.

Figure 38A:
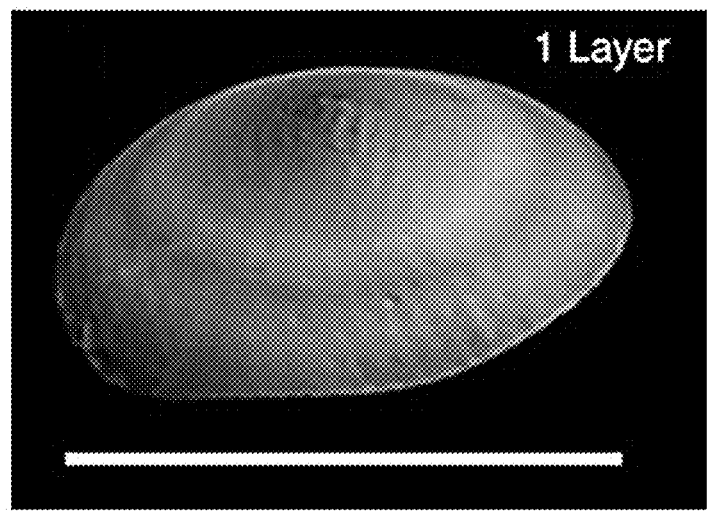
FIGS. 38A-38C are images of the deformation of the single film layer, the double film layer laminate, and the four film layer laminate.
Figure 38B:
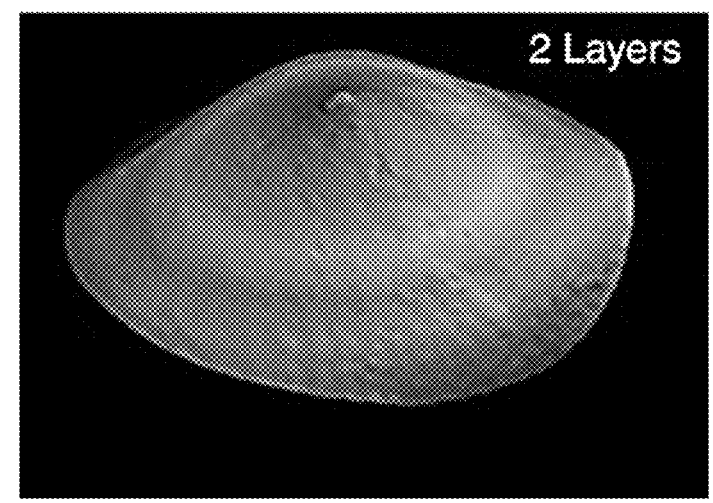
Figure 38C:
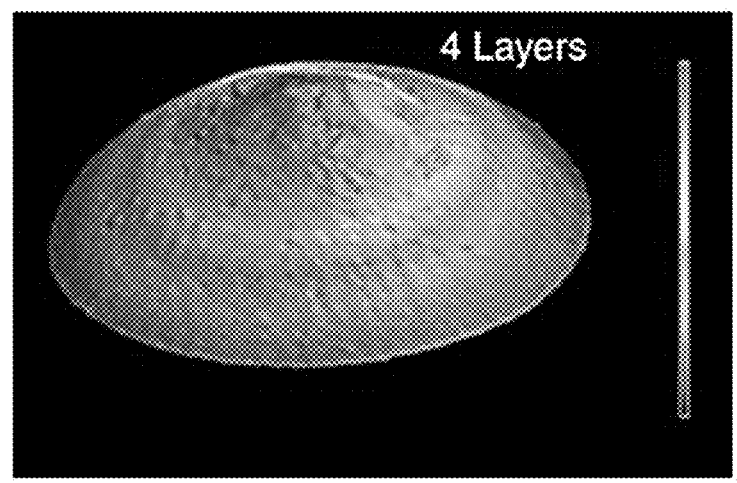

The deformation of single layer, double layer, and four layer LCE laminates was quantified by structured-illumination optical profilometry (Keyence VR-3000). The LCE film and laminates actuate into cones upon heating. The amplitude of the peak height (3.4 mm, about 70 times the film thickness) and the angle of the cone tip are nearly identical among films of 50 μm (single layer), 102 μm (double layer), and 210 μm (four layer) thickness (FIGS. 38A-38C). The increased thickness of the laminates does not diminish the shape transformation. The insensitivity of the shape-morphing to film thickness was in agreement with a prediction of that the deformation of an LCE sheet into a cone should be largely independent of sheet thickness, except for slight deviation near the tip. The agreement evident in FIGS. 37-38C was strong, indirect evidence that each LCE layer as well as the adhesive interfaces are cooperatively deforming.

In a previous report, a 2×2 array of +1 topological defects in a 50 μm thick LCE film was shown to lift up to 150 times its weight with a stroke of 1 mm. The stroke per force output of the single layer LCE films translates to a specific work capacity of 2.6 J/kg.

Figure 39:
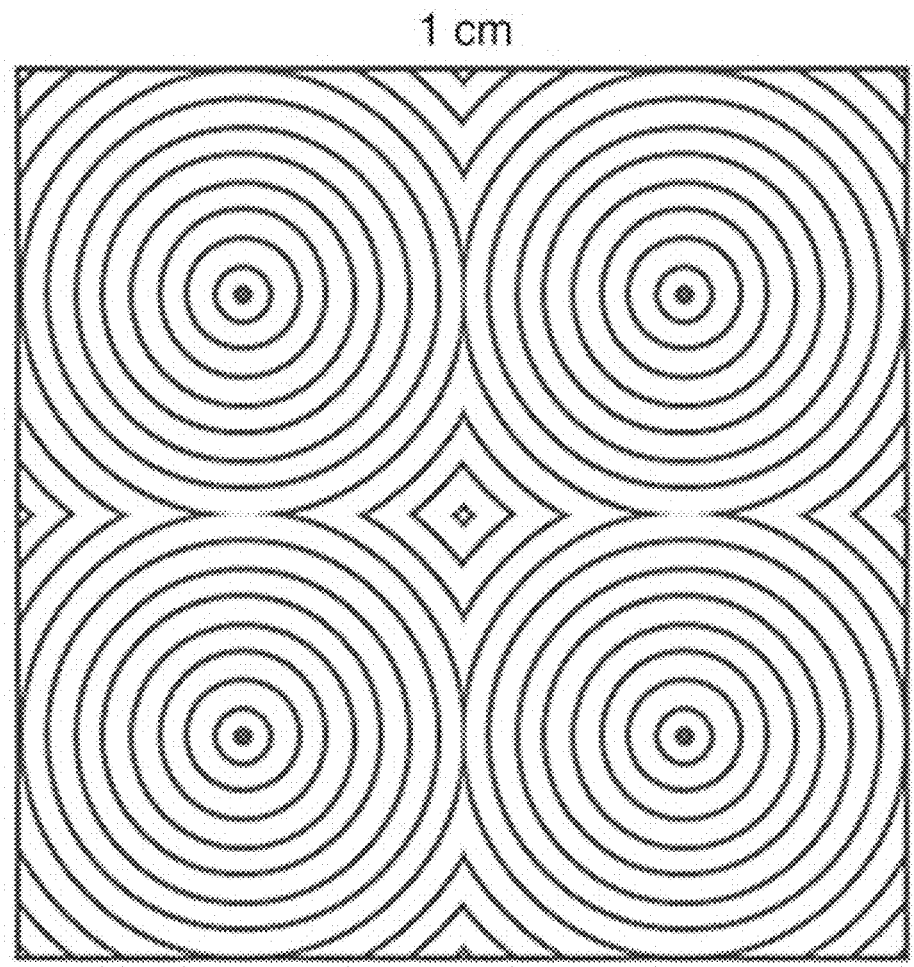
FIG. 39 is a schematic illustration of an exemplary director profile.
Figure 40:
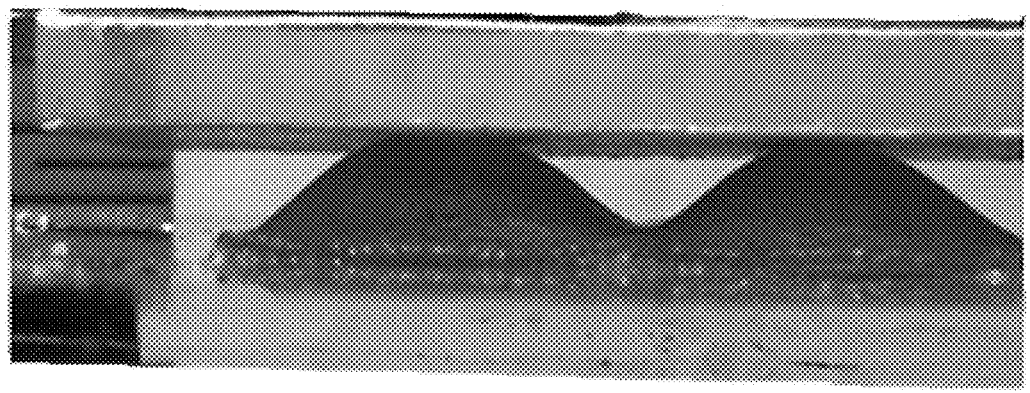
FIG. 40 is a photograph of a four film layer laminate, imaged with the director profile of FIG. 39, under load of a glass slide and weight.

The characterization and potential actuation force of the LCE laminates were assessed. The 1×1 cm LCE films were patterned into a 2×2 arrays of radial +1 topological defects (director profile illustrated in FIG. 39) were prepared. Single, double, and four layer LCE laminates were heated with a resistive heating element. A piece of glass (28.7 g, 1100 times film weight) was placed on top of the films, which was loaded with weight. As illustrated in the representative photograph in FIG. 40, the deformation of the films was observable under load. The deformation under load for one, two, and four layer LCE laminates are presented in FIG. 41. Similar to the unloaded case in FIGS. 38A-38C, the stroke of the LCEs under load was relatively unaffected with increasing thickness. However, the increase in thickness increases the output force dramatically. The four layer LCE laminate (210 μm thick) produces 280 mN of force at a stroke of 1.6 mm. As illustrated in FIG. 42, the specific work may reach nearly 19 J/kg. The four layer LCE laminate with the director configuration described in FIG. 39 may lift over 1100 times the weight of the film itself, a 100 times improvement in specific work when compared to a single layer LCE.

Figure 43:
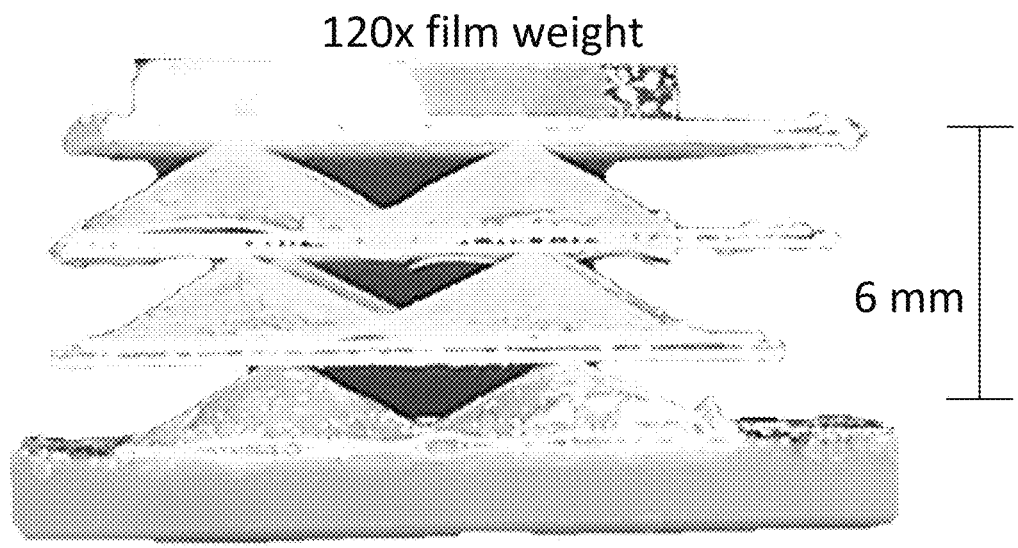
FIG. 43 is a photograph of a large stroke actuator having stacked films-glass coverslips under load.

When selecting actuators both force output and stroke length are important considerations. So-called piezoelectric stacks may be emulated. As is evident in FIG. 43, a large stroke actuator comprising film stacked on top of each other and separated by a rigid substrate (glass coverslips). With three LCE layers, a stroke exceeding 6 mm was achieved while still lifting 120 times the weight of the assembled device.

Figure 45:
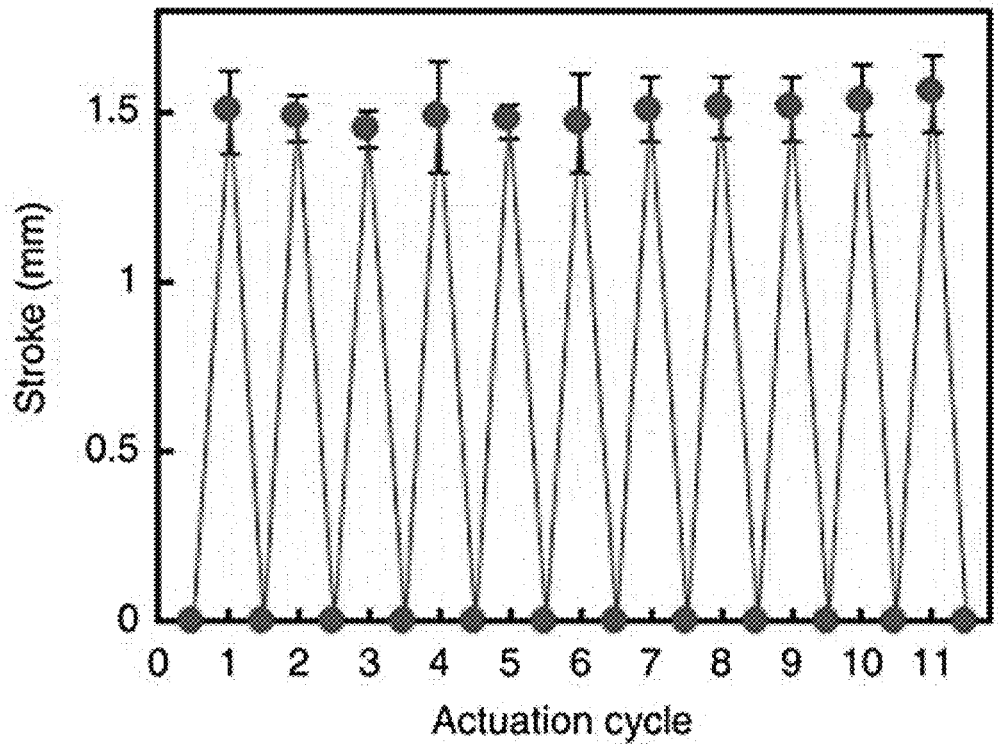
FIG. 45 graphically illustrates consistency in stroke after 11 thermal cycles.
Figure 44A:
FIGS. 44A-44C are photographs of cyclic deformation of a film prepared in accordance with an embodiment of the present invention at different temperatures.
Figure 44B:
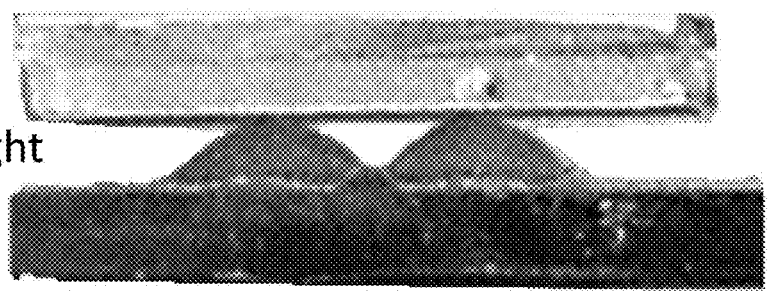
Figure 44C:
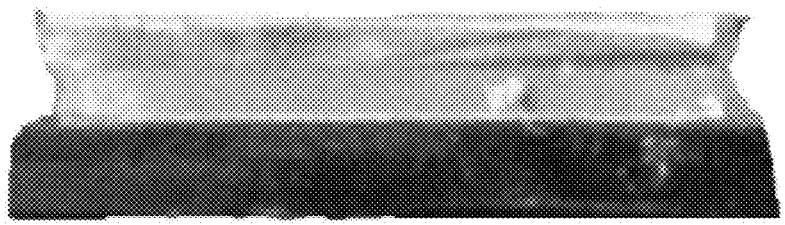

A distinguishing characteristic of LCEs in contrast to other shape-changing polymeric systems is the reversibility and resistance to fatigue. Shape memory effects in polymers must be reprogrammed after each actuation. The robustness of the actuation of the LCE films was examined. FIGS. 44A and 44B contrasts the deformation of an LCE film under the load of nearly 1 g. There was little distinguishable difference in stroke or shape of LCE film after 10 thermal cycles. FIG. 44C is representative of the flat state reached by the LCE films after each cycle; FIG. 45 summarizes the consistency in the stroke observable in 11 thermal cycles.

Figure 46:
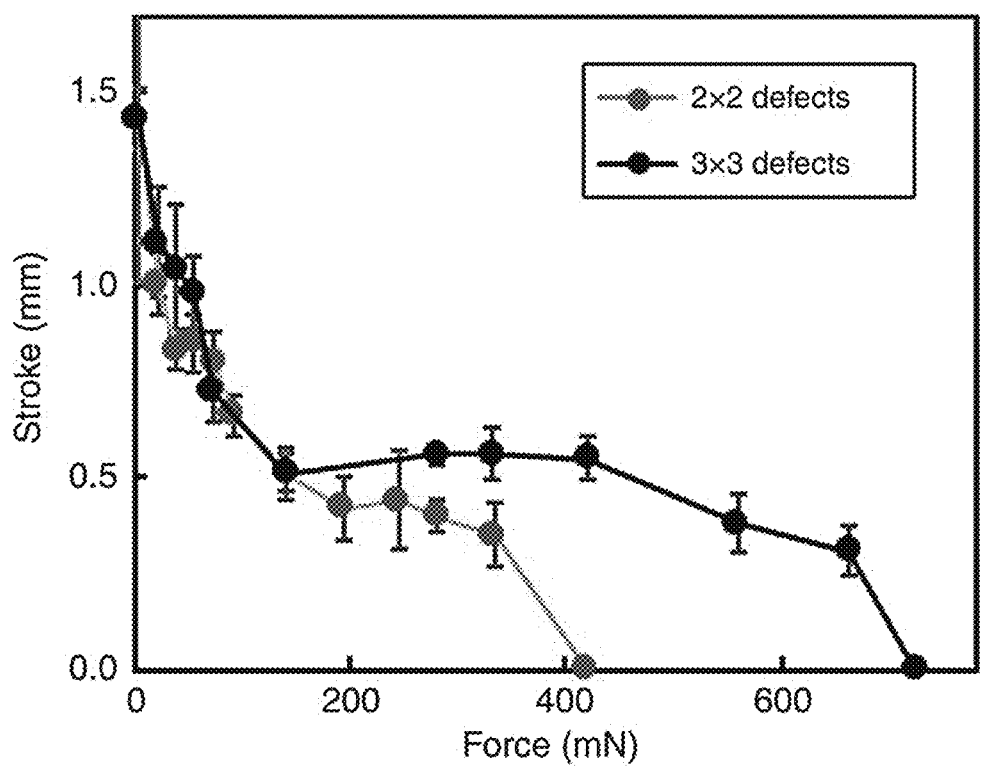
FIG. 46 graphically illustrates deformation of films prepared in accordance with embodiments of the present invention and with 2×2 defects and 3×3 defects.
Figure 47:
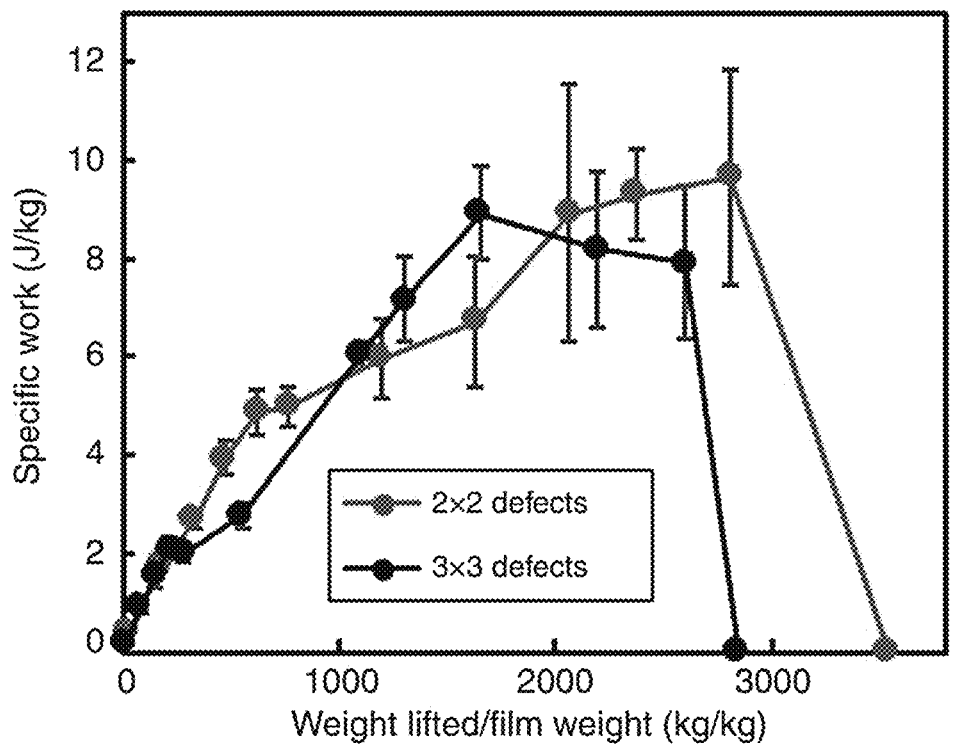
FIG. 47 graphically illustrates specific work of films prepared in accordance with embodiments of the present invention with 2×2 defects and 3×3 defects.
Figure 48:
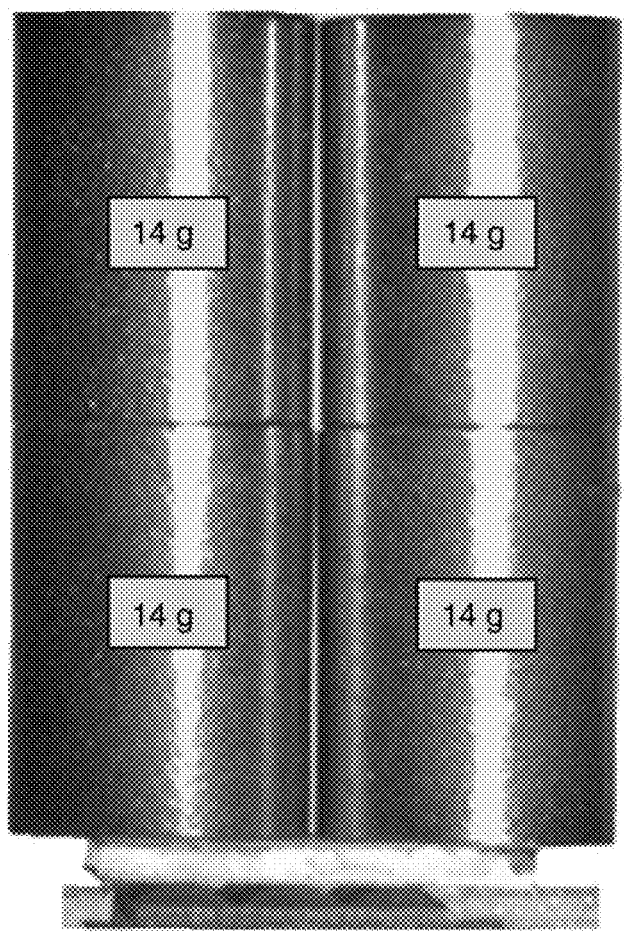
FIG. 48 is a photograph of a four film layer laminate prepared in accordance with an embodiment of the present invention under load that is 2150 times the film weight.

The study included examining a 2×2 array of +1 topological defects in a 1 cm$^2$ film. The force output onto the loaded substrate should be sensitive to the number of contact points. To illustrate this, LCE films with a 3×3 array of +1 defects were prepared in 1 cm$^2$ films. By increasing the number of defects (contact points) from four to nine, the total force output increases from 300 mN (FIG. 41) to 560 mN (FIG. 46). Evident in FIG. 47, the four layer LCE laminate composed of the 3×3 array of +1 defects was able to lift 2150 times the weight of the film itself. A four layer LCE film may lift 56 g nearly 0.5 mm (FIG. 48).

Figure 41:
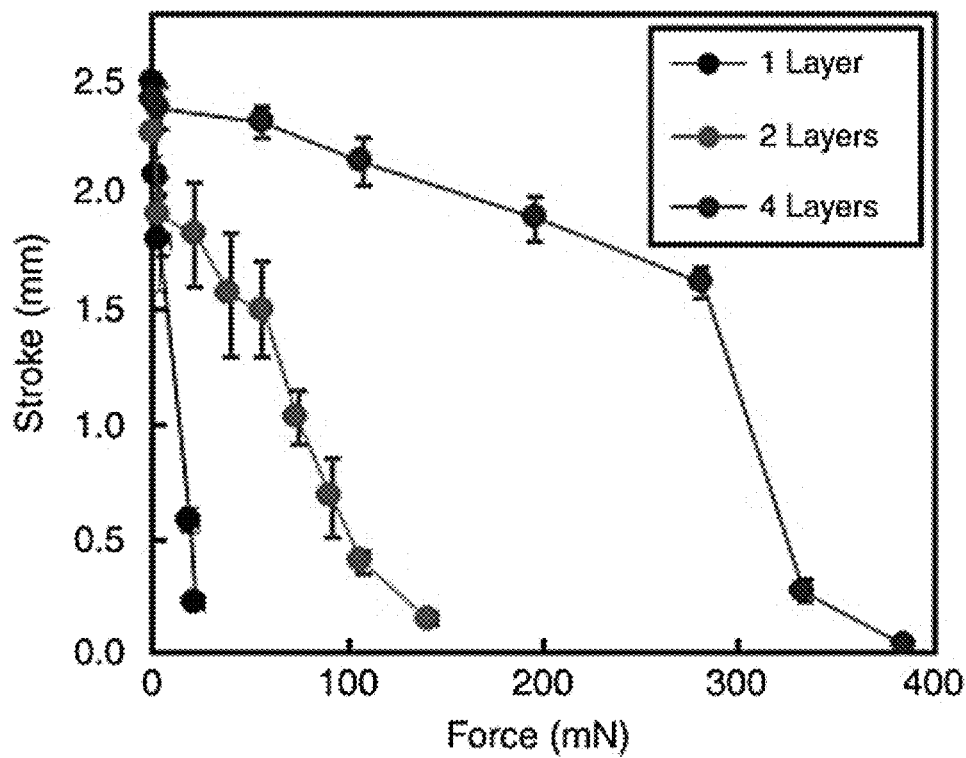
FIG. 41 graphically illustrates deformation of the single film layer, the double film layer laminate, and the four film layer laminate imaged with the director profile of FIG. 39.
Figure 42:
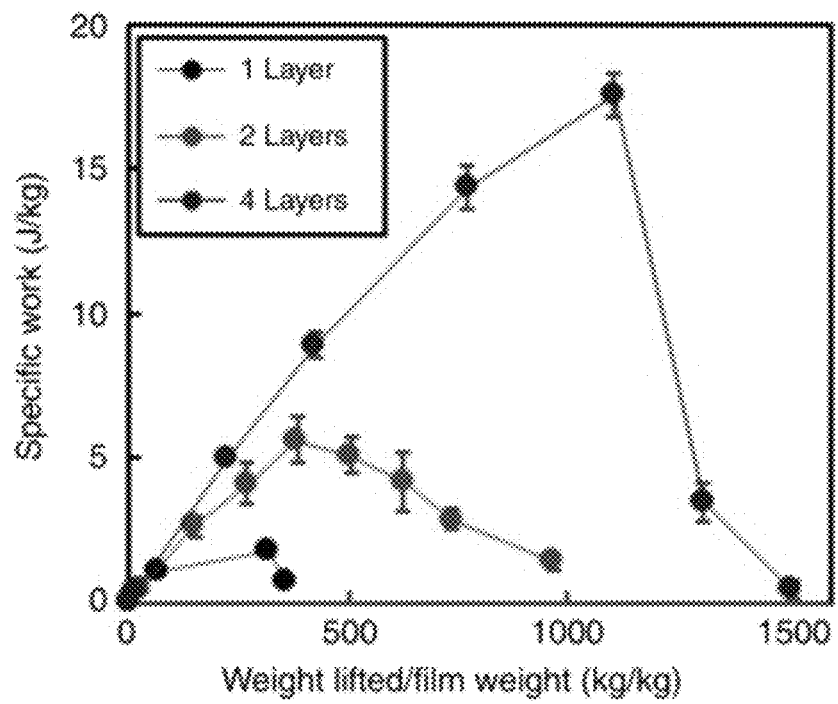
FIG. 42 graphically illustrates specific work of the single film layer, the double film layer laminate, and the four film layer laminate imaged with the director profile of FIG. 39.

Evident in FIG. 46, the stroke was significantly decreased for the 3×3 arrays in the 1 cm$^2$ film when compared to the 2×2 arrays in the 1 cm$^2$ films examined in FIG. 41. The direct comparison of 2×2 and 3×3 arrays in FIGS. 46 and 47 are from samples in which the dimensions of each defect region was 0.33×0.33 cm. These LCE laminates exhibit identical stroke lengths. However, evident in FIG. 46, the output force was considerably increased by increasing the number of contact points. Conceivably, employing large area patterning techniques and substrates not available to us in our laboratory could allow for preparing larger area films composed of 1000s of contact points.

Numerous end-use applications of LCEs have been proposed, such as irises, biomimetic actuators, valves, and shape-changing lenses. One potential aerospace application may include reconfigurable topographical surface features to manipulate flow. The deformation of the LCE laminates under positive pressure was also examined. LCE films were once again patterned with radial +1 topological defects. The deformation of a single defect subsumed in the center of a 12 mm diameter film was examined. The LCE laminates were placed in a pressure chamber where the back (or bottom) of the film was maintained at ambient pressure while the front (or top) was subjected to positive pressure. The entire chamber was heated and then the shape of the film was measured via optical profilometry.

Figure 49:
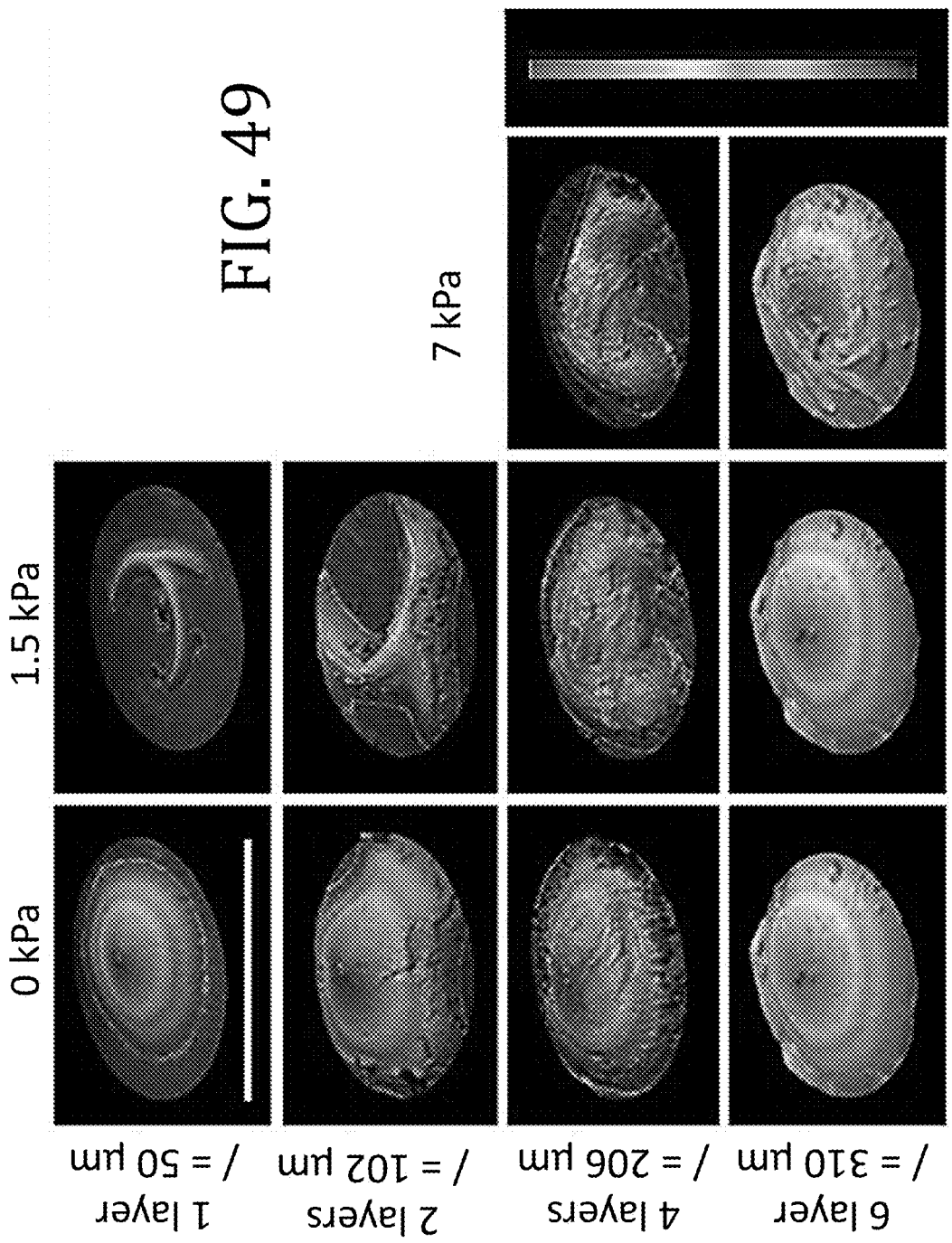
FIG. 49 includes optical scans for comparison of deformation of a single film layer, a double film layer laminate, a four film layer laminate, and a six film layer laminate at various environmental pressures.
Figure 50:
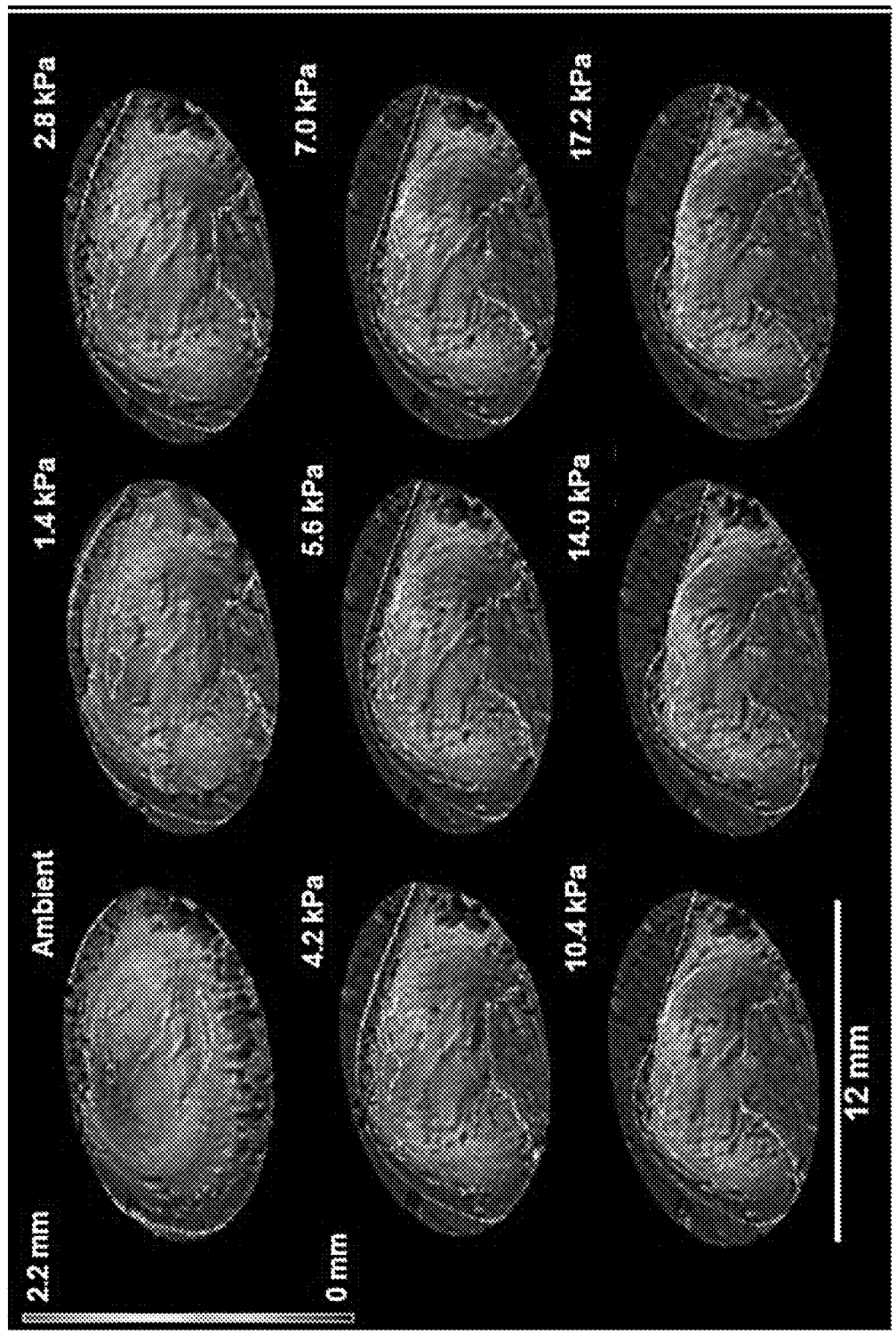
FIG. 50 includes optical scans for comparison of deformation of a four layer film laminate over a ranges of pressures.
Figure 51:
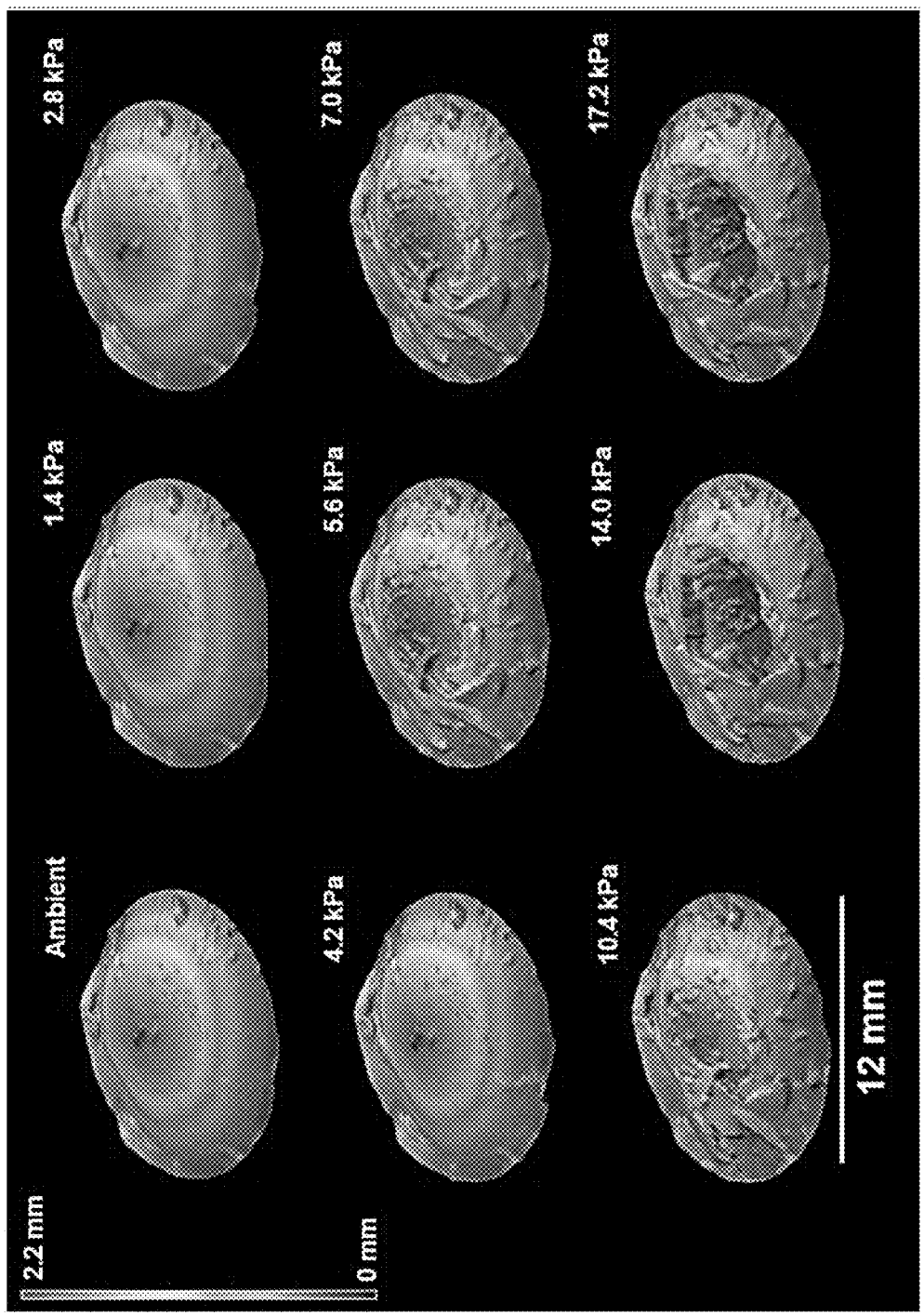
FIG. 51 includes optical scans for comparison of deformation of a six-layer film laminate over a range of pressures.

FIG. 49 presents the optical scans of single, double, four, and six layer LCE laminates. Direct heating of the films in ambient pressure conditions results in the expected conical deformations (0 kPa). Notably, the deformation of the films was less than that observed in free standing films, largely attributable to film anchoring. However, upon adding even slight positive pressure, the single layer film (50 μm) immediately loses its shape, compressing into the pressure chamber. The two layer LCE laminate behaves similarly. Informed by the prior results, the four layer LCE laminate (210 μm) withstands much higher loads and was able to maintain a cone-like shape at 1.5 kPa of pressure. A six layer LCE laminate (320 μm) was able to withstand over 7 kPa (more than 1 psi) and still maintain a conical shape. Profiles of actuated samples are shown in FIGS. 50 and 51.

As described herein, embodiments to approaching thick LCE films capable of large force output and stroke are described. Upon exposure to thermal stimulus, the LCE laminates deform into the expected shapes. Notably, despite the increase in film thickness in the LCE laminates, the deformations of the materials (e.g., the stroke) remain constant. The increase in thickness allow the laminates to impart work on objects more than 2000 times heavier than the laminates themselves. End-use applications in aerospace, such as reconfigurable topographical surfaces, require deformation to positive pressure. Six layer LCE laminates are shown to deform up to 7 kPa pressure and retain the expected conical deformation.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of synthesizing a shape-programmable liquid crystal elastomer, the method comprising:
   filling an alignment cell with liquid crystal monomers comprising a mixture of a first mesogenic diacrylate and a second mesogenic diacrylate having a ratio of the first mesogenic diacrylate to the second mesogenic diacrylate suppresses nematic-crystallization phase transition, wherein the liquid crystal monomers align to a surface of the alignment cell; and
   polymerizing the liquid crystal monomers with a dithiol chain transfer agent,
   wherein the alignment cell is configured to impose a director orientation on a portion of the shape-programmable liquid crystal elastomer.

2. The method of claim 1, wherein the liquid crystal monomers are mesogenic diacrylates.

3. The method of claim 2, wherein the mesogenic diacrylate is selected from the group consisting of 1,4-bis[4-(3-acryloyloxybutyloxy)benzoyloxy]-2-methylbenzene, 1,4-bis-[4-(6-acryloyloxyhexyloxy)benzoyloxy]-2-methylbenzene, and 1,4-bis[4-(11-acryloyloxyundecyloxy)-benzoyloxy]-2-methylbenzene.

4. The method of claim 1, wherein the dithiol chain transfer agent is a C2-C6 alkyl-dithiol.

5. The method of claim 4, wherein the dithiol chain transfer agent is selected from the group consisting of ethane dithiol, propane dithiol, hexane dithiol, and 1,4-benzenedimethanethiol.

6. The method of claim 1, wherein an amount of thiol incorporated into the liquid crystal elastomer ranges from about 30% to about 50% by weight.

7. The method of claim 1, further comprising:
   introducing a photoinitiator before filling the alignment cell.

8. The method of claim 7, wherein the photoinitiator is 2, 2-dimethoxy-2-phenylacetophenone.

9. The method of claim 7, wherein the photoinitiator and liquid crystal monomers are melted before filling the alignment cell.

10. The method of claim 1, wherein polymerizing liquid crystal monomers with a dithiol chain transfer agent includes applying ultraviolet light.

11. The method of claim 1, wherein the filled alignment cell is cooled before the liquid crystal monomers are polymerized.

12. A liquid crystal elastomer laminate comprising:
   a plurality of shape-programmable liquid crystal elastomers prepared in accordance with claim 1, the plurality of shape-programmable liquid crystal elastomers being clamped and heated to form the laminate.

13. The liquid crystal elastomer laminate of claim 12, wherein the imposed directors of the plurality of shape-programmable liquid crystal elastomers are aligned.

14. The liquid crystal elastomer laminate of claim 12, wherein a layer of mesogenic diacrylate is placed between adjacent ones of the plurality of shape-programmable liquid crystal elastomers.

15. A method for preparing a liquid crystal elastomer laminate, the method comprising:
- arranging a first layer comprising first liquid crystal elastomers on a surface of a second layer comprising second liquid crystal elastomers such that a director orientation of each of the first and second liquid crystal elastomers is in registered alignment, wherein each of the first and second liquid crystal elastomers is prepared in accordance with claim 1;
- securing the arrangement of the first and second liquid crystal elastomers;
- curing the first and second liquid crystal elastomers; and
- releasing the cured first and second elastomers.

16. The method of claim 15, further comprising:
- coating at least one of the first and second liquid crystal elastomers with a mesogenic diacrylate before arranging the first and second liquid crystal elastomers.

17. The method of claim 15, wherein curing the first and second liquid crystal elastomers further comprises:
- heating the first and second liquid crystal elastomers; and
- applying ultraviolet light to the first and second liquid crystal elastomers.

* * * * *